(12) United States Patent
Sakamoto et al.

(10) Patent No.: US 9,019,348 B2
(45) Date of Patent: Apr. 28, 2015

(54) DISPLAY DEVICE, IMAGE PICKUP DEVICE, AND VIDEO DISPLAY SYSTEM

(71) Applicant: Olympus Corporation, Tokyo (JP)

(72) Inventors: Akihiko Sakamoto, Hachioji (JP); Ryuichi Kiyoshige, Hachioji (JP)

(73) Assignee: Olympus Corporation, Tokyo (JP)

( * ) Notice: Subject to any disclaimer, the term of this patent is extended or adjusted under 35 U.S.C. 154(b) by 375 days.

(21) Appl. No.: 13/669,704

(22) Filed: Nov. 6, 2012

(65) Prior Publication Data

US 2013/0120534 A1 May 16, 2013

(30) Foreign Application Priority Data

Nov. 10, 2011 (JP) .................................. 2011-246511

(51) Int. Cl.
*H04N 13/02* (2006.01)
*G06T 15/20* (2011.01)
*G06T 3/00* (2006.01)

(52) U.S. Cl.
CPC ............. *G06T 15/205* (2013.01); *G06T 3/0006* (2013.01)

(58) Field of Classification Search
CPC ................. G02B 2027/014; G02B 2027/0138; G06T 15/20; G06T 15/205; H04N 5/232; H04N 1/00129
USPC ....................... 348/46, 174; 382/103; 345/659
See application file for complete search history.

(56) References Cited

U.S. PATENT DOCUMENTS

| 8,259,173 | B2 * | 9/2012 | Iwano | 348/148 |
|---|---|---|---|---|
| 2004/0246229 | A1 * | 12/2004 | Yamada | 345/156 |
| 2006/0255986 | A1 * | 11/2006 | Takanezawa et al. | 341/67 |
| 2008/0297601 | A1 * | 12/2008 | Okada et al. | 348/159 |
| 2009/0184981 | A1 * | 7/2009 | de Matos | 345/676 |
| 2010/0097483 | A1 * | 4/2010 | Icho et al. | 348/222.1 |

FOREIGN PATENT DOCUMENTS

JP 2002-367080 A 12/2002

* cited by examiner

*Primary Examiner* — Sath V Perungavoor
*Assistant Examiner* — Nathnael Aynalem
(74) *Attorney, Agent, or Firm* — Westerman, Hattori, Daniels & Adrian, LLP

(57) ABSTRACT

A display device comprising a storage unit that stores a video signal of a subject, image capturing position information, and shooting direction information, a display unit, a display posture information acquiring unit, a calculating unit that calculates a relative positional relation of a plurality of image capturing positions in a stereoscopic space based on the image capturing position information stored in the storage unit, and calculates a relative directional relation of a plurality of shooting directions in the display direction of the display unit based on the shooting direction information stored in the storage unit and the display direction information acquired by the display posture information acquiring unit, and a control unit that controls the display unit displaying a rotation video obtained by rotating the video of the subject corresponding to the video signal stored in the storage unit according to the relative directional relation calculated by the calculating unit.

17 Claims, 16 Drawing Sheets

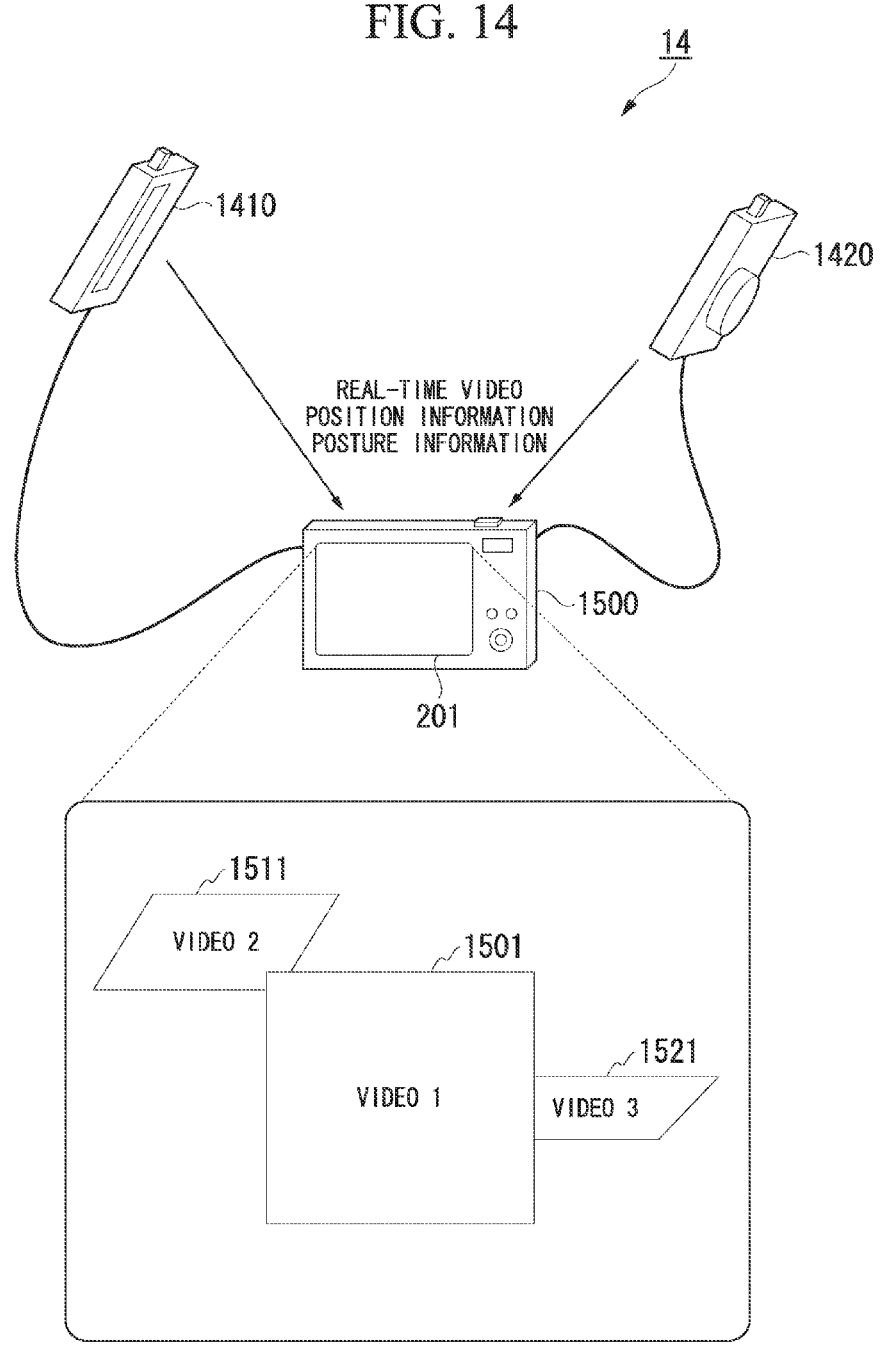

DISPLAY DEVICE, IMAGE PICKUP DEVICE, AND VIDEO DISPLAY SYSTEM

BACKGROUND OF THE INVENTION

1. Field of the Invention

The present invention relates to a display device, an image pickup device, and a video display system.

Priority is claimed on Japanese Patent Application No. 2011-246511, filed Nov. 10, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the past, systems using an image pickup device such as an electronic camera have been proposed. For example, Japanese Unexamined Patent Application, First Publication No. 2002-367080, which is hereinafter referred to as Patent Document 1, discloses a technique of a visual assistance system for a vehicle that includes an image pickup device mounted in a vehicle and displays a video of a subject captured by an image pickup device mounted in another vehicle so that a user of a person's vehicle can easily use the video.

In the technique disclosed in Patent Document 1, position information of the person's vehicle is transmitted to the other vehicle, and the person's vehicle receives a video captured by the image pickup device mounted in the other vehicle and position information of the other vehicle. Further, in the person's vehicle, a point of view at which a video is displayed on a display device mounted in the person's vehicle is set in advance, and the relative position of a point of view at which the other vehicle performs shooting to the set display point of view is calculated based on the position information of the person's vehicle, the position information of the other vehicle, and installation information of the image pickup device mounted in the other vehicle. Based on information of the calculated relative position, the video received from the other vehicle is converted into a video of a previously set display point of view, and then the converted video is displayed on the display device mounted in the person's vehicle.

Using the technique disclosed in Patent Document 1, it is possible to display a plurality of videos in which a specific subject is reflected based on the position information of the image pickup device that has captured (transmitted) the video. In other words, according to the technique disclosed in Patent Document 1, when a specific subject is specified, the position of the specific subject can be easily recognized.

SUMMARY

The present invention provides a display device, an image pickup device, and a video display system in which, when a plurality of image pickup devices capture different subjects, the position of each subject captured by each image pickup device can be easily visually recognized.

A display device may include: a storage unit configured to store, in association with one another, a video signal of a subject, image capturing position information representing an image capturing position when the subject is imaged, and shooting direction information representing a shooting direction when the subject is imaged; a display unit configured to display a video of the subject; a display posture information acquiring unit configured to acquire display direction information representing a display direction in which the display unit displays the video of the subject; a calculating unit configured to calculate a relative positional relation of a plurality of image capturing positions in a stereoscopic space based on the image capturing position information stored in the storage unit, and to calculate a relative directional relation of a plurality of shooting directions in the display direction of the display unit based on the shooting direction information stored in the storage unit and the display direction information acquired by the display posture information acquiring unit; and a control unit configured to cause the display unit to display a rotation video obtained by rotating the video of the subject corresponding to the video signal stored in the storage unit according to the relative directional relation calculated by the calculating unit at a position at which videos of a plurality of subjects to be displayed on the display unit maintain the relative positional relation in a display region of the display unit when videos of the subjects respectively corresponding to a plurality of video signals stored in the storage unit are displayed on the display unit.

The display device may further include: a data communication unit configured to acquire the video signal of the subject, the image capturing position information, and the shooting direction information from an image capturing terminal that has imaged the subject. The storage unit may store the video signal, the image capturing position information, and the shooting direction information acquired by the data communication unit.

The calculating unit may calculate the relative positional relation based on the image capturing position information associated with one video signal among a plurality of video signals stored in the storage unit.

The shooting direction information acquired by the data communication unit may include direction information and pitch angle information. The calculating unit may calculate the relative directional relation based on the direction information and the pitch angle information.

The control unit may use a surface crossing the display direction at a right angle as a surface of the display region, and cause the rotation video to be displayed on the surface of the display region at a position onto which the relative positional relation is projected.

The data communication unit may acquire the video signal, the image capturing position information, and the shooting direction information by wireless communication.

The display device may further include: a display position information acquiring unit configured to acquire display device position information representing a display position when the display unit displays the video of the subject. The calculating unit may calculate the relative positional relation using the display position as a reference based on display device position information acquired by the display position information acquiring unit and the image capturing position information stored in the storage unit.

The control unit may cause one rotation video used as a reference to be displayed at a central position of the display region and causes another rotation video to be displayed at a position at which the relative positional relation with the rotation video used as the reference is maintained.

The display device may further include: an image capturing unit configured to image the subject and output the video signal; an image capturing position information acquiring unit configured to acquire image capturing position information representing an image capturing position when the image capturing unit images the subject; and an image capturing posture information acquiring unit configured to acquire shooting direction information representing a shooting direction when the image capturing unit images the subject. The storage unit may store a video signal output from the image capturing unit in association with the image capturing position information acquired by the image capturing position information acquiring unit and the shooting direction information acquired by the image capturing posture information acquiring unit.

The control unit may cause a rotation video corresponding to the video of the subject imaged by the image capturing unit to be displayed at a central position of the display region.

The data communication unit may transmit a video signal output from the image capturing unit, the image capturing position information acquired by the image capturing position information acquiring unit, and the shooting direction information acquired by the image capturing posture information acquiring unit to an external terminal.

A device that comprises: a storage unit that stores, in association with one another, a video signal of a subject, image capturing position information representing an image capturing position at which the subject is imaged, and shooting direction information representing a shooting direction in which the subject is imaged; a display unit that displays a video of the subject; a display posture information acquiring unit that acquires display direction information representing a display direction in which the display unit displays the video of the subject; a calculating unit that calculates a relative positional relation of a plurality of image capturing positions in a stereoscopic space based on the image capturing position information stored in the storage unit, and calculates a relative directional relation of a plurality of shooting directions in the display direction of the display unit based on the shooting direction information stored in the storage unit and the display direction information acquired by the display posture information acquiring unit; and a control unit that displays a rotation video obtained by rotating the video of the subject corresponding to the video signal stored in the storage unit according to the relative directional relation calculated by the calculating unit at a position at which videos of a plurality of subjects to be displayed on the display unit maintain the relative positional relation in a display region of the display unit when videos of the subjects respectively corresponding to a plurality of video signals stored in the storage unit are displayed on the display unit; may be defined as a display device. An image pickup device may include: an image capturing unit that images a subject and outputs a video signal of the subject; an image capturing position information acquiring unit that acquires image capturing position information representing an image capturing position at which the image capturing unit images the subject; an image capturing posture information acquiring unit that acquires shooting direction information representing a shooting direction in which the image capturing unit images the subject; and a data communication unit that transmits the video signal output from the image capturing unit, the image capturing position information acquired by the image capturing position information acquiring unit, and the shooting direction information acquired by the image capturing posture information acquiring unit to the display device.

The data communication unit may transmit the video signal, the image capturing position information, and the shooting direction information to the display device by wireless communication.

A video display system that displays a video of a subject may include: a plurality of image capturing units, each of which images the subject and outputs a video signal corresponding to the subject; an image capturing position information acquiring unit that acquires image capturing position information representing an image capturing position at which the image capturing unit images the subject; an image capturing posture information acquiring unit that acquires shooting direction information representing a shooting direction in which the image capturing unit images the subject; a display unit that displays the video of the subject; a display posture information acquiring unit that acquires display direction information representing a display direction in which the display unit displays the video of the subject; a storage unit that stores, in association with one another, the video signal output from the image capturing unit, the image capturing position information acquired by the image capturing position information acquiring unit, and the shooting direction information acquired by the image capturing posture information acquiring unit; a calculating unit that calculates a relative positional relation of a plurality of image capturing positions in a stereoscopic space based on the image capturing position information stored in the storage unit, and calculates a relative directional relation of a plurality of shooting directions in the display direction of the display unit based on the shooting direction information stored in the storage unit and the display direction information acquired by the display posture information acquiring unit; and a control unit that displays a rotation video obtained by rotating the video of the subject corresponding to the video signal stored in the storage unit according to the relative directional relation calculated by the calculating unit at a position at which videos of a plurality of subjects to be displayed on the display unit maintain the relative positional relation in a display region of the display unit when videos of the subjects respectively corresponding to a plurality of video signals stored in the storage unit are displayed on the display unit.

The video display system may include: a plurality of image capturing terminals, each of which includes the image capturing unit, the image capturing position information acquiring unit, and the image capturing posture information acquiring unit; and a display terminal that includes the display unit, the display posture information acquiring unit, the storage unit, the calculating unit, and the control unit.

The image capturing terminal may further include the display unit, the display posture information acquiring unit, the storage unit, the calculating unit, and the control unit.

The display terminal may further include the image capturing unit, the image capturing position information acquiring unit, and the image capturing posture information acquiring unit.

According to the preferred embodiments of the present invention, when a plurality of image pickup devices capture different subjects, the position of each subject captured by each image pickup device can be easily visually recognized.

BRIEF DESCRIPTION OF THE DRAWINGS

The above features and advantages of the present invention will be more apparent from the following description of certain preferred embodiments taken in conjunction with the accompanying drawings, in which:

FIG. 14 is a diagram illustrating a schematic configuration of a video display system in accordance with a fourth preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
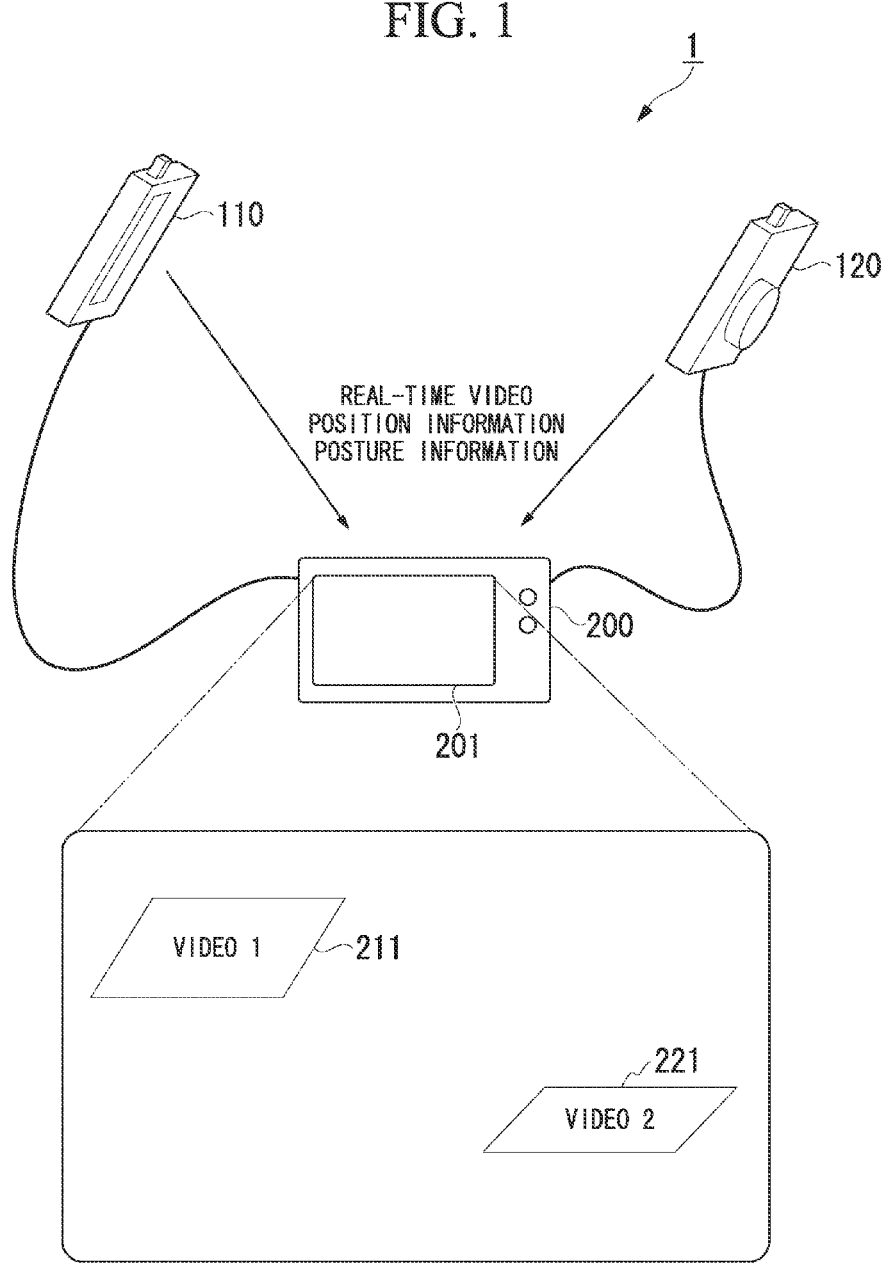
FIG. 1 is a diagram illustrating a schematic configuration of a video display system in accordance with the first preferred embodiment of the present invention.

FIG. 1 is a diagram illustrating a schematic configuration of a video display system in accordance with a first preferred embodiment of the present invention. FIG. 1 illustrates an example of a video display system that displays a real-time video transmitted from each image pickup device on a display unit of a display device based on a real-time video (video signal of a subject), position information, and posture information which are transmitted from each of a plurality of image pickup devices, and posture information of a display device.

Here, a "real-time video" refers to a video which is captured by an image capturing unit of an image pickup device and then sequentially transmitted to be displayed on a display unit of a display device. Further, posture information of an image pickup device refers to information including information representing at least a direction in which an image pickup device faces (performs shooting) and a pitch angle, and posture information of a display device refers to information including information representing at least a direction in which a display device faces (performs a display) and a pitch angle.

A video display system 1 illustrated in FIG. 1 includes image pickup devices 110 and 120 (hereinafter referred to as an "image pickup device 100" when representing all image pickup devices together) and a display device 200. In the video display system 1, the image pickup devices 110 and 120 are connected to the display device 200 in a wired manner.

In the video display system 1, the display device 200 acquires a real-time video, position information, and posture information which are transmitted from each of the image pickup device 110 and the image pickup device 120. Thereafter, the display device 200 calculates a relative position of the image pickup device 110 and the image pickup device 120 based on the position information and the posture information of each of the image pickup device 110 and the image pickup device 120 and posture information of the display device 200. In addition, the display device 200 calculates a relative direction of the image pickup device 120 based on a direction (hereinafter referred to as a "shooting direction") in which the image pickup device 110 performs shooting. Further, the display device 200 causes the real-time videos acquired from the image pickup device 110 and the image pickup device 120 to be simultaneously displayed on a display unit 201 of the display device 200 based on the relative position and the relative direction calculated.

In the video display system 1 illustrated in FIG. 1, a real-time video 1 acquired from the image pickup device 110 is displayed on a display region 211 of the display unit 201, and a real-time video 2 acquired from the image pickup device 120 is displayed on a display region 221 of the display unit 201. The detailed description related to a method of calculating the relative position and the relative direction in the display device 200 and a method of displaying a real-time video on the display unit 201 will be described later.

Next, the image pickup device which is a component of the video display system 1 will be described. In the video display system 1 in accordance with the first preferred embodiment of the present invention, the image pickup device 110 and the image pickup device 120 have the same configuration as each other. Thus, although the following description will proceed in connection with the image pickup device 110, the description applies similarly to the image pickup device 120.

Figure 2:
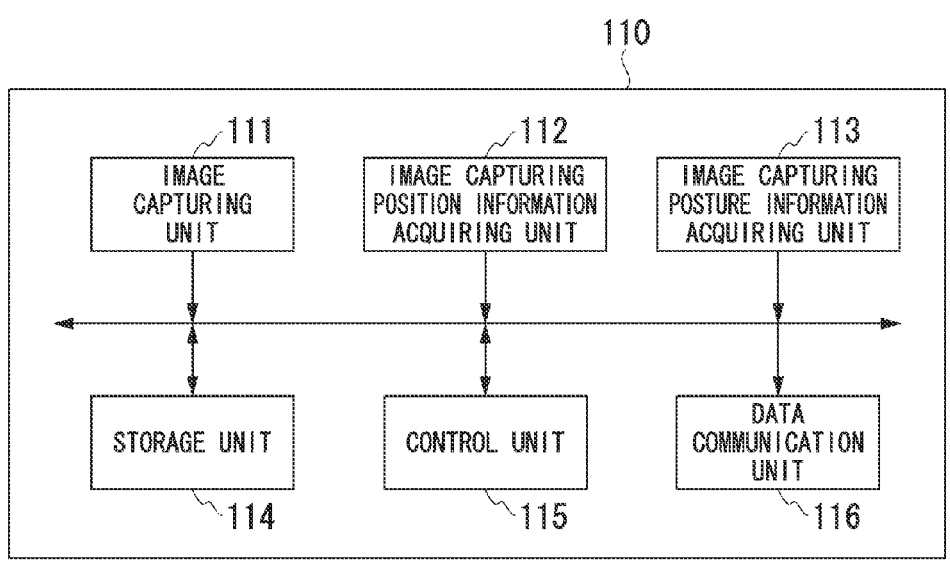
FIG. 2 is a block diagram illustrating a schematic configuration of an image pickup device in the video display system in accordance with the first preferred embodiment of the present invention.

FIG. 2 is a block diagram illustrating a schematic configuration of the image pickup device 110 in the video display system 1 in accordance with the first preferred embodiment of the present invention. As illustrated in FIG. 2, the image pickup device 110 includes an image capturing unit 111, an image capturing position information acquiring unit 112, an image capturing posture information acquiring unit 113, a storage unit 114, a control unit 115, and a data communication unit 116.

The control unit 115 controls operations of the components of the image pickup device 110, that is, an operation of the image pickup device 110 in general.

For example, the image capturing unit 111 includes an imager that captures a subject, images a real-time video under control of the control unit 115, and outputs the imaged real-time video to the storage unit 114.

The image capturing position information acquiring unit 112 detects the position at which the image pickup device 110 is installed, that is, an image capturing position, under control of the control unit 115, and outputs image capturing position information representing the detected position of the image pickup device 110 to the storage unit 114.

The image capturing position information detected by the image capturing position information acquiring unit 112 is information representing an absolute position at which the image pickup device 110 is installed, and includes at least the longitude, the latitude, and the altitude. For example, the image capturing position information acquiring unit 112 may be configured to include a global positioning system (GPS) sensor. In this case, the image capturing position information may include at least the longitude, the latitude, and the altitude which are detected by the GPS sensor.

The image capturing posture information acquiring unit 113 detects an image capturing posture of the image pickup device 110, that is, a shooting direction of the image pickup device 110 under control of the control unit 115, and outputs shooting direction information representing the detected posture of the image pickup device 110 to the storage unit 114.

The shooting direction information detected by the image capturing posture information acquiring unit 113 includes at least image capturing direction information representing a direction in which an optical axis of the image pickup device 110 faces when north is used as a reference direction and image capturing pitch angle information representing a pitch angle of the optical axis of the image pickup device 110 when a plane level with the surface of the ground is used as a reference. For example, the image capturing posture information acquiring unit 113 may be configured to include a magnetic field sensor and an acceleration sensor. In this case, the shooting direction information may include at least image capturing direction information detected by the magnetic field sensor and image capturing pitch angle information detected by the acceleration sensor.

The storage unit 114 stores the real-time video output from the image capturing unit 111, the image capturing position information output from the image capturing position information acquiring unit 112, and the shooting direction information output from the image capturing posture information acquiring unit 113 in association with one another.

The data communication unit 116 transmits the real-time video, the image capturing position information, and the shooting direction information stored in the storage unit 114 to the display device 200 under control of the control unit 115.

Figure 3:
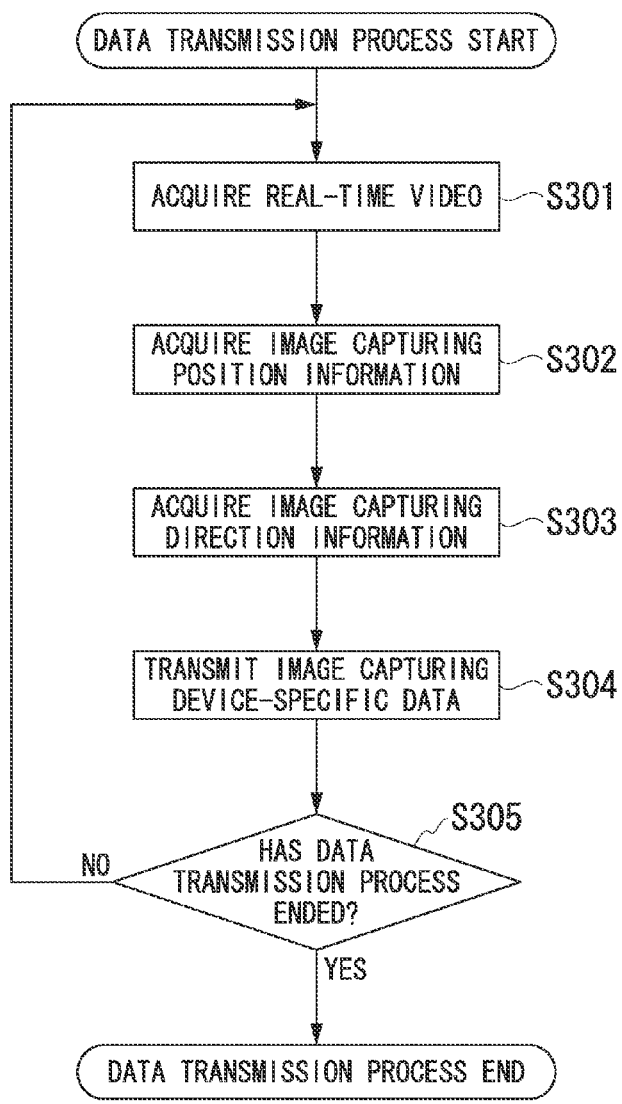
FIG. 3 is a flowchart illustrating a data transmission process in the image pickup device of the video display system in accordance with the first preferred embodiment of the present invention.

Next, an operation of the image pickup device 110 in the video display system 1 will be described. The following description will proceed in connection with an operation of the image pickup device 110 but applies similarly to an operation of the image pickup device 120. FIG. 3 is a flowchart illustrating a data transmission process in the image pickup device 110 of the video display system 1 in accordance with the first preferred embodiment of the present invention.

The control unit 115 starts a data transmission process when a command (a data transmission process start command) causing the image pickup device 110 to start the data transmission process is received. Here, the data transmission process start command is a command issued by using application of power of the image pickup device 110 as a trigger. Here, when the data transmission process starts, the control unit 115 causes the image capturing unit 111 to image a real-time video. Then, the image capturing unit 111 causes the imaged real-time video to be stored in the storage unit 114 (step S301). In addition, the image capturing unit 111 notifies the control unit 115 of the fact that the real-time video has been stored in the storage unit 114.

Here, the issuance of the data transmission process start command is not limited to the example in which application of power is issued as a trigger. For example, the data transmission process start command may be issued when a connection between the display device 200 and the image pickup device 110 which constitute the video display system 1 is established. Further, when the image pickup device 110 includes a user interface unit used when a user operates the image pickup device 110, the data transmission process start command may be issued by using an operation input of the user interface unit as a trigger.

Next, upon receiving the notice representing that the real-time video has been stored in the storage unit 114 from the image capturing unit 111, the control unit 115 causes the image capturing position information acquiring unit 112 to detect the position of the image pickup device 110. Then, the image capturing position information acquiring unit 112 causes the detected image capturing position information to be stored in the storage unit 114 (step S302). In addition, the image capturing position information acquiring unit 112 notifies the control unit 115 of the fact that the image capturing position information has been stored in the storage unit 114.

Thereafter, upon receiving the notice representing that the image capturing position information has been stored in the storage unit 114 from the image capturing position information acquiring unit 112, the control unit 115 causes the image capturing posture information acquiring unit 113 to detect the posture of the image pickup device 110. Then, the image capturing posture information acquiring unit 113 causes the detected shooting direction information to be stored in the storage unit 114 (step S303). In addition, the image capturing posture information acquiring unit 113 notifies the control unit 115 of the fact that the shooting direction information has been stored in the storage unit 114.

Thereafter, when the notice representing that the shooting direction information has been stored in the storage unit 114 is received from the image capturing posture information acquiring unit 113, the control unit 115 transmits the real-time video, the image capturing position information, and the shooting direction information (hereinafter, the real-time video, the image capturing position information, and the shooting direction information are collectively referred to as "image pickup device-specific data") stored in the storage unit 114 to the display device 200 through the data communication unit 116 (step S304).

Thereafter, when the image pickup device-specific data is completely transmitted through the data communication unit 116, the control unit 115 determines whether or not a command (the data transmission process end command) causing the image pickup device 110 to end the data transmission process has been issued (step S305). Here, when it is determined that the data transmission process end command has been issued ("YES" in step S305), the data transmission process ends. However, when it is determined that the data transmission process end command has not been issued ("NO" in step S305), the process returns to step S301, and then the process from the image capturing of the real-time video by the image capturing unit 111 to the data transmission process of the image pickup device-specific data is repeated.

Figure 4:
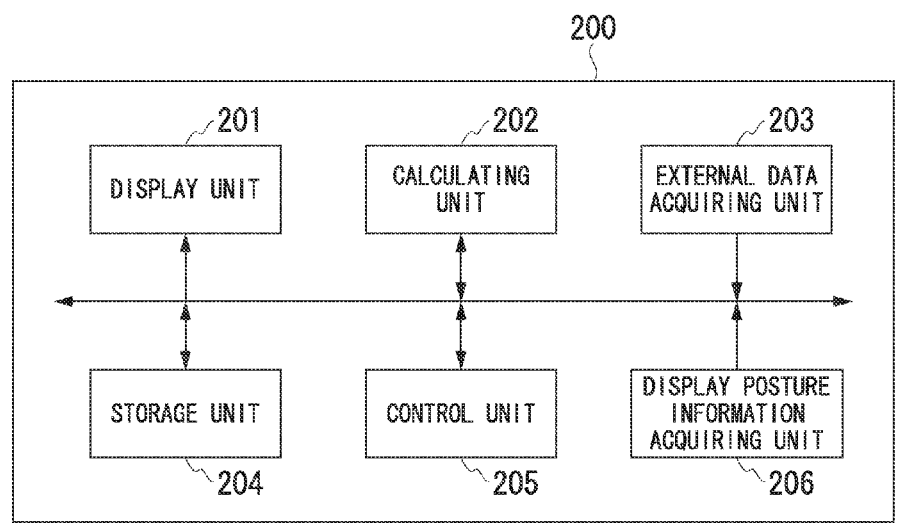
FIG. 4 is a block diagram illustrating a schematic configuration of a display device in the video display system in accordance with the first preferred embodiment of the present invention.

Next, the display device 200 which is a component of the video display system 1 will be described. FIG. 4 is a block diagram illustrating a schematic configuration of the display device 200 in the video display system 1 in accordance with the first preferred embodiment of the present invention. As illustrated in FIG. 4, the display device 200 includes the display unit 201, a calculating unit 202, an external data acquiring unit 203, a storage unit 204, a control unit 205, and a display posture information acquiring unit 206.

The control unit 205 controls operations of the components of the display device 200, that is, an operation of the display device 200 in general.

The external data acquiring unit 203 acquires the image pickup device-specific data (the real-time video, the image capturing position information, and the shooting direction information) from each image pickup device 100 in the video display system 1 under control of the control unit 205. The external data acquiring unit 203 outputs each piece of the acquired image pickup device-specific data to the storage unit 204.

The display posture information acquiring unit 206 detects the posture of the display device 200, that is, a display direction, under control of the control unit 205, and outputs display direction information representing the detected posture to the storage unit 204.

The display direction information detected by the display posture information acquiring unit 206 includes at least display direction information representing a direction in which a normal vector vertical to the surface of the display unit 201 of the display device 200 faces when north is used as a reference direction and display pitch angle information representing a pitch angle of a normal vector vertical to the surface of the display unit 201 of the display device 200 when a plane level with the surface of the ground is used as a reference. For example, the display posture information acquiring unit 206 may be configured to include a magnetic field sensor and an acceleration sensor. In this case, the display direction information may include at least display direction information detected by the magnetic field sensor and display pitch angle information detected by the acceleration sensor.

The storage unit 204 stores the image pickup device-specific data of the image pickup device 100 output from the external data acquiring unit 203 in association with each other. Further, the storage unit 204 stores the display direction information output from the display posture information acquiring unit 206. The calculating unit 202 calculates a relative positional relation (hereinafter referred to as a "relative position") of the real-time videos in a stereoscopic space (a three-dimensional (3D) space) and a relative directional relation (hereinafter referred to as a "relative direction") of the display direction and the shooting direction of each real-time video based on the image capturing position information and the shooting direction information of each image pickup device (the image pickup device 110 and the image pickup device 120 in the first preferred embodiment of the present invention) included in the image pickup device-specific data stored in the storage unit 204 and the display direction information of the display device 200 stored in the storage unit 204 under control of the control unit 205.

For example, the display unit 201 includes a liquid crystal display (LCD), and displays the real-time videos of the image pickup devices (the image pickup device 110 and the image pickup device 120 in the first preferred embodiment of the present invention) included in the image pickup device-specific data stored in the storage unit 204 under control of the control unit 205 which is based on the relative position and the relative direction calculated by the calculating unit 202.

Figure 5:
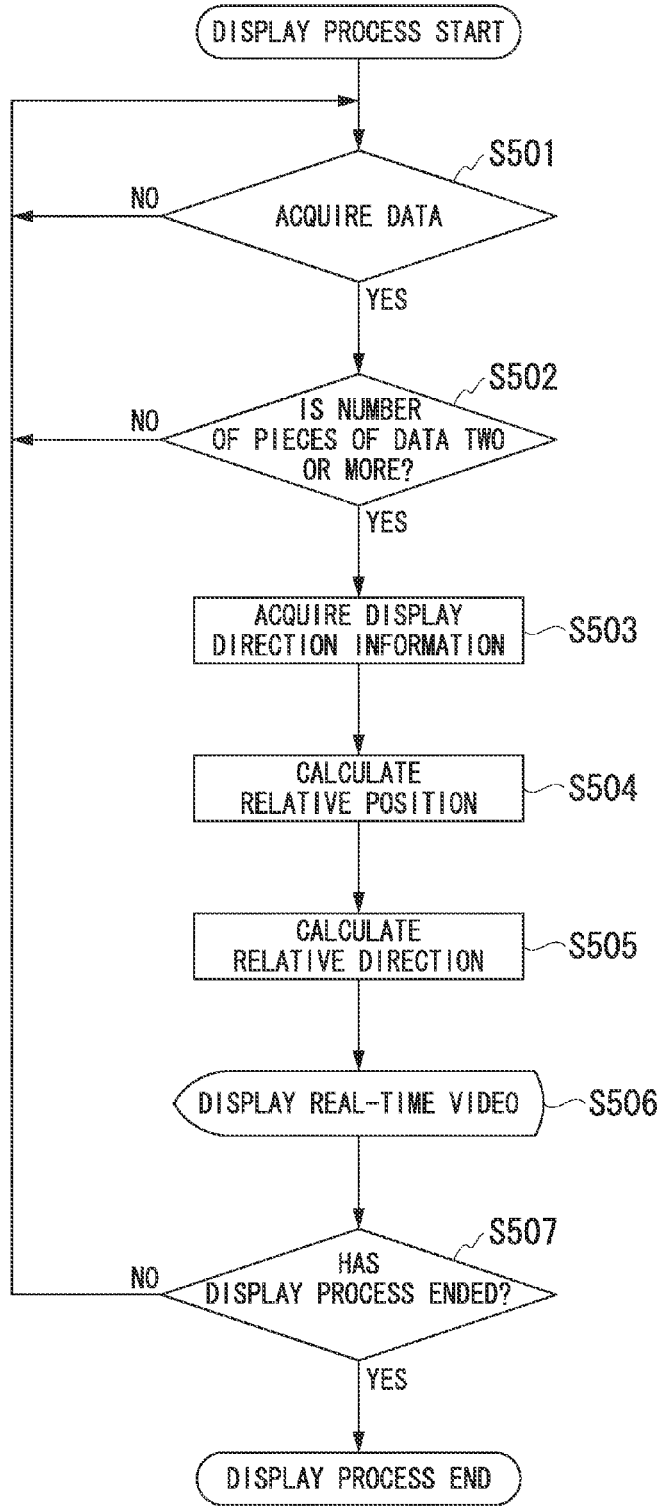
FIG. 5 is a flowchart illustrating a display process in the display device of the video display system in accordance with the first preferred embodiment of the present invention.

Next, an operation of the display device 200 in the video display system 1 will be described. FIG. 5 is a flowchart illustrating a display process in the display device 200 of the video display system 1 in accordance with the first preferred embodiment of the present invention.

Upon receiving a command (the display process start command) causing the display device 200 to start a display process, the control unit 205 starts the display process. Here, the display process start command is a command issued by using application of power of the display device 200 as a trigger. Here, when the display process starts, the control unit 205 enters a standby state to wait for acquisition of the image pickup device-specific data (the real-time video, the image capturing position information, and the shooting direction information) from the image pickup device 100 (step S501).

Here, the issuance of the display process start command is not limited to the example described above in which application of power is issued as a trigger. For example, the display process start command may be issued when a connection between any one of the image pickup devices and the display device 200 which constitute the video display system 1 is established. Further, when the display device 200 includes a user interface unit used when a user operates the display device 200, the display process start command may be issued by using a user's operation input of the user interface unit as a trigger.

Thereafter, when the image pickup device-specific data is acquired from any one (for example, the image pickup device 110) of the image pickup devices 100 through the external data acquiring unit 203 ("Yes" in step S501), the control unit 205 causes the acquired image pickup device-specific data to be stored in the storage unit 204. Then, the control unit 205 determines whether or not a plurality of pieces of image pickup device-specific data have been acquired with reference to the number of pieces of image pickup device-specific data stored in the storage unit 204 (step S502).

Here, when it is determined that a plurality of pieces of image pickup device-specific data have not been acquired ("NO" in step S502), the process returns to step S501, and enters a standby state to wait for acquisition of the image pickup device-specific data of any one (for example, the image pickup device 120) of the image pickup devices 100 again. However, when it is determined that a plurality of pieces of image pickup device-specific data have been acquired ("YES" in step S502), the process proceeds to step S503.

Thereafter, the control unit 205 causes the display posture information acquiring unit 206 to detect the posture of the display device 200. Then, the display posture information acquiring unit 206 causes the detected display direction information to be stored in the storage unit 204 (step S503). In addition, the display posture information acquiring unit 206 notifies the control unit 205 of the fact that the display direction information has been stored in the storage unit 204.

Thereafter, when the notice representing that the display direction information has been stored in the storage unit 204 is received from the display posture information acquiring unit 206, the control unit 205 issues a command (a relative position calculation command) that causes the calculating unit 202 to calculate the relative position of one image pickup device (for example, the image pickup device 120) based on the image capturing position information (that is, the image capturing position information of the real-time video imaged by the image pickup device 110) of another image pickup device (for example, the image pickup device 110). Upon receiving the relative position calculation command from the control unit 205, the calculating unit 202 reads the image capturing position information of the image pickup devices (the image pickup device 110 and the image pickup device 120) included in the image pickup device-specific data stored in the storage unit 204, and calculates the relative position. Then, the calculating unit 202 causes a result of the calculated relative position to be stored in the storage unit 204 (step S504). In addition, the calculating unit 202 notifies the control unit 205 of the fact that the relative position has been stored in the storage unit 204. A method of calculating the relative position through the calculating unit 202 will be described later in detail.

Thereafter, when the notice representing that the relative position has been stored in the storage unit 204 is received from the calculating unit 202, the control unit 205 issues a command (a relative direction calculation command) causing the calculating unit 202 to calculate the relative direction of the image pickup devices (the image pickup device 110 and the image pickup device 120) based on the display direction information of the display device 200. Upon receiving the relative direction calculation command from the control unit 205, the calculating unit 202 reads the shooting direction information of the image pickup devices (the image pickup device 110 and the image pickup device 120) included in the image pickup device-specific data stored in the storage unit 204 and the display direction information of the display device 200, and calculates the relative direction. Then, the calculating unit 202 causes a result of the calculated relative direction to be stored in the storage unit 204 (step S505). In addition, the calculating unit 202 notifies the control unit 205 of the fact that the relative direction has been stored in the storage unit 204. Here, the relative direction calculated by the calculating unit 202 includes at least information representing a relative direction which is a direction in which each image pickup device performs shooting when a direction of the display device 200 is used as a reference and information representing a relative pitch angle which is a pitch angle at which each image pickup device performs shooting when a pitch angle of the display device 200 is used as a reference. A method of calculating the relative direction through the calculating unit 202 will be described later in detail.

Thereafter, when the notice representing that the relative direction has been stored in the storage unit 204 is received from the calculating unit 202, the control unit 205 causes the real-time videos included in a plurality of pieces of image pickup device-specific data acquired from the image pickup devices 100, which are stored in the storage unit 204, to be displayed on the display unit 201 based on the relative position and the relative direction stored in the storage unit 204 (step S506). After displaying the real-time video, the display unit 201 notifies the control unit 205 of the fact that a display of the real-time video has been completed. A display method of causing the real-time video to be displayed on the display unit 201 based on the relative position and the relative direction will be described later in detail.

Thereafter, when the notice representing that the display of the real-time video has been completed is received from the display unit 201, the control unit 205 determines whether or not a command (a display process end command) to end the display process of the display device 200 has been issued (step S507). Here, when it is determined that the display process end command has been issued ("YES" in step S507), the display process ends. However, when it is determined that the display process end command has not been issued ("NO" in step S507), the process returns to step S501, and the process from the acquisition of the image pickup device-specific data from the image pickup device 100 to the display of the display unit 201 based on the acquired image pickup device-specific data is repeated again.

Figure 6A:
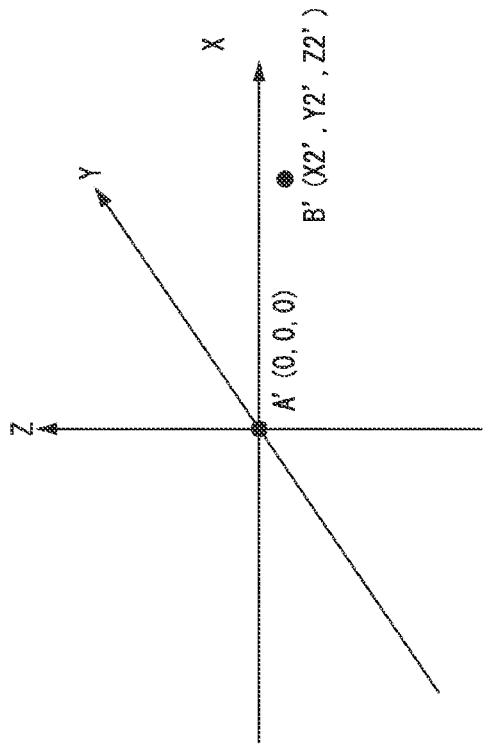
FIGS. 6A and 6B are diagrams for describing an example of a method of calculating a relative position in the display device of the video display system in accordance with the first preferred embodiment of the present invention.
Figure 6B:
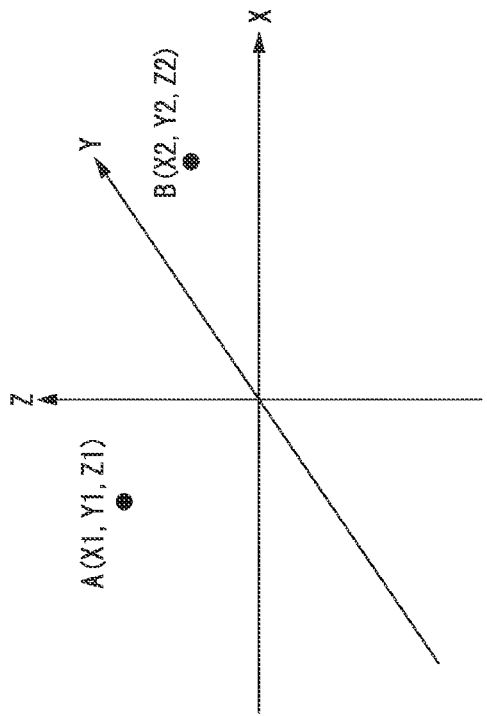

Next, in the operation of the display device 200 of the video display system 1, a method of calculating the relative position described in step S504 of FIG. 5 will be described. FIGS. 6A and 6B are diagrams for describing an example of a method of calculating the relative position in the display device 200 of the video display system 1 in accordance with the first preferred embodiment of the present invention.

In FIGS. 6A and 6B, X, Y, and Z represent the longitude, the latitude, and the altitude, respectively. FIG. 6A represents a positional relation between the image pickup device 110 and the image pickup device 120 based on the respective pieces of image capturing position information. FIG. 6B represents a positional relation between the image pickup device 110 and the image pickup device 120 through the relative position when the position of the image pickup device 110 is used as a reference.

More specifically, the position information A (X1, Y1, Z1) and the position information B (X2, Y2, Z2) illustrated in FIG. 6A are the image capturing position information in the image pickup device 110 and the image capturing position information in the image pickup device 120, respectively, and are the image capturing position information included in the image pickup device-specific data acquired from the image pickup devices 100 in step S501 illustrated in FIG. 5.

The calculating unit 202 calculates the relative position of one image pickup device of the image pickup devices 100 using another image pickup device as a reference according to the relative position calculation command from the control unit 205. FIG. 6B illustrates a relative position B' (X2', Y2', Z2') corresponding to the position information B (X2, Y2, Z2) of the image pickup device 120 when the position information A (X1, Y1, Z1) of the image pickup device 110 is used as a reference (a relative position A' (0,0,0)). The relative position B' (X2', Y2', Z2') of the image pickup device 120 is obtained by the following Formula (1):

$$X2'=X2-X1$$

$$Y2'=Y2-Y1$$

$$Z2'=Z2-Z1 \qquad (1)$$

Next, in the operation of the display device 200 of the video display system 1, a method of calculating the relative direction described in step S505 of FIG. 5 will be described. FIGS. 7A to 7D are diagrams for describing an example of a method of calculating the relative direction in the display device 200 of the video display system 1 in accordance with the first preferred embodiment of the present invention.

Figure 7A:
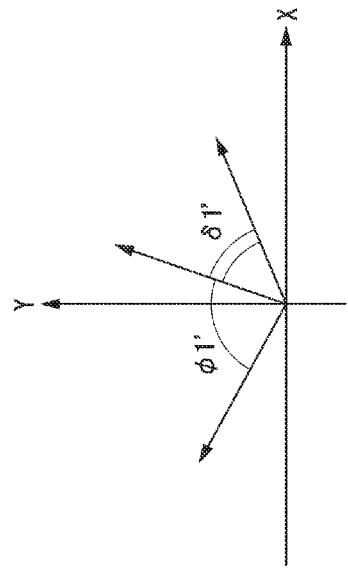
FIGS. 7A to 7D are diagrams for describing an example of a method of calculating a relative direction in the display device of the video display system in accordance with the first preferred embodiment of the present invention.
Figure 7B:
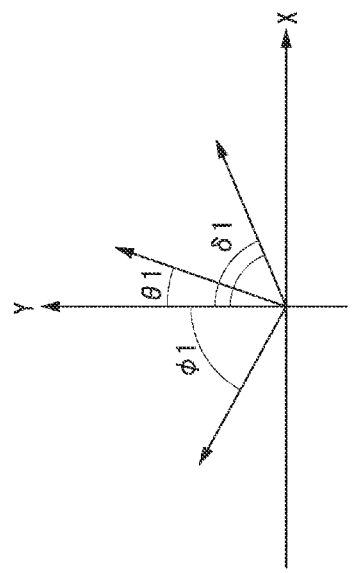

In FIGS. 7A and 7B, X and Y represent a northerly direction and an easterly direction, respectively. FIG. 7A illustrates a directional relation among the display device 200, the image pickup device 110, and the image pickup device 120 based on the display direction information and the shooting direction information thereof. FIG. 7B illustrates a directional relation among the display device 200, the image pickup device 110, and the image pickup device 120 through the relative direction when a direction of the display device 200 is used as a reference. More specifically, direction information θ1, direction information φ1, and direction information δ1 illustrated in FIG. 7A are the display direction information in the display device 200, the shooting direction information of the image pickup device 110, and the shooting direction information of the image pickup device 120. The direction information θ1 is information representing a direction of the display device 200 detected by the display posture information acquiring unit 206 in step S503 illustrated in FIG. 5. The direction information φ1 and the direction information M are information representing a direction of the image pickup device 110 and a direction of the image pickup device 120 included in the image pickup device-specific data acquired from the image pickup devices 100 in step S501 illustrated in FIG. 5.

The calculating unit 202 calculates the relative direction of the image pickup device 110 and the image pickup device 120 when a direction of the display device 200 is used as a reference in response to the relative direction calculation command from the control unit 205. FIG. 7B illustrates relative direction information φ1' corresponding to the direction information φ1 which is the shooting direction information of the image pickup device 110 when the direction information θ1 which is the display direction information in the display device 200 is used as a reference and relative direction information δ1' corresponding to the direction information M which is the shooting direction information of the image pickup device 120. The relative direction information φ1' of the image pickup device 110 and the relative direction information δ1' of the image pickup device 120 are obtained by the following Formula (2):

$$\varphi 1'=\varphi 1-\theta 1$$

$$\delta 1'=\delta 1-\theta 1 \qquad (2)$$

Figure 7C:
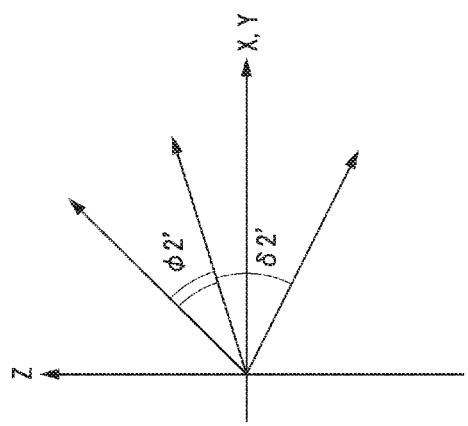
Figure 7D:
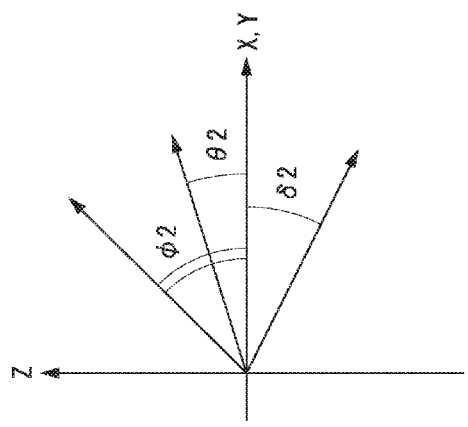

In FIGS. 7C and 7D, X and Y represent a direction of the longitude and a direction of the latitude, and Z represents a direction of the altitude. FIG. 7C illustrates a pitch angle relation among the display device 200, the image pickup device 110, and the image pickup device 120 based on the display direction information and the shooting direction information thereof. FIG. 7D illustrates a pitch angle relation among the display device 200, the image pickup device 110, and the image pickup device 120 through the relative pitch angle when a pitch angle of the display device 200 is used as a reference.

More specifically, a pitch angle θ2, a pitch angle φ2, and a pitch angle δ2 illustrated in FIG. 7C are the display direction information in the display device 200, the shooting direction information of the image pickup device 110, and the shooting direction information of the image pickup device 120, respectively. The pitch angle θ2 is information representing a pitch angle of the display device 200 detected by the display posture information acquiring unit 206 in step S503 illustrated in FIG. 5. The pitch angle φ2 and the pitch angle δ2 are information representing pitch angles of the image pickup device 110 and the image pickup device 120 included in the image pickup device-specific data acquired from the image pickup device 100 in step S501 illustrated in FIG. 5.

The calculating unit 202 calculates the relative pitch angles of the image pickup device 110 and the image pickup device 120 with respect to the display device 200 in response to the relative direction calculation command from the control unit 205. FIG. 7D illustrates a relative pitch angle φ2' corresponding to the pitch angle φ2 which is the shooting direction information of the image pickup device 110 and a relative pitch angle δ2' corresponding to the pitch angle δ2 which is the shooting direction information of the image pickup device 120 when the pitch angle θ2 which is the display direction information in the display device 200 is used as a reference. The relative pitch angle φ2' of the image pickup device 110 and the relative pitch angle δ2' of the image pickup device 120 are obtained by the following Formula (3):

$$\varphi 2'=\varphi 2-\theta 2$$

$$\delta 2'=\delta 2-\theta 2 \qquad (3)$$

Next, in the operation of the display device 200 of the video display system 1, a display method of a real-time video described in step S506 of FIG. 5 will be described. FIGS. 8A to 8J are diagrams for describing an example of a display method of a real-time video in the display device 200 of the video display system 1 in accordance with the first preferred embodiment of the present invention.

Figure 8A:
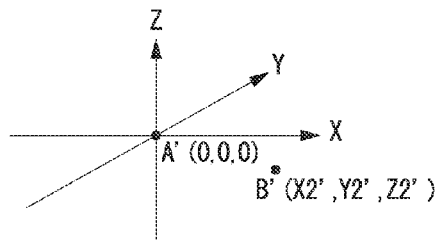
FIGS. 8A to 8J are diagrams for describing an example of a display method of a real-time video in the display device of the video display system in accordance with the first preferred embodiment of the present invention.

In FIG. 8A, X, Y, and Z represent the longitude, the latitude, and the altitude, respectively. FIG. 8A illustrates the relative position of the image pickup device 110 and the image pickup device 120 when the position of the image pickup device 110 calculated by the calculating unit 202 in step S504 of FIG. 5 is used as a reference. In other words, FIG. 8A is similar to FIG. 6B. Thus, a relative position A' (0, 0, 0) illustrated in FIG. 8A represents the image capturing position information of the image pickup device 110 used as a reference, and the relative position B' (X2', Y2', Z2') represents the image capturing position information of the image pickup device 120.

Figure 8B:
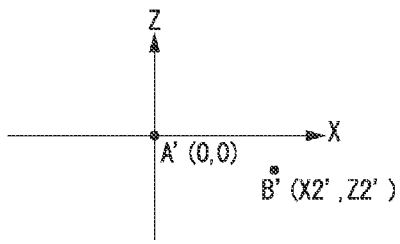

Here, a method of calculating the relative position of the image pickup device 110 and the image pickup device 120 when the display device 200 faces in a Y-axis direction will be described. FIG. 8B illustrates a result of calculating the relative position of the image pickup device 110 and the image pickup device 120 when the display device 200 faces in a Y-axis direction. In FIG. 8B, X and Z represent the longitude and the altitude, respectively.

As illustrated in FIG. 8B, when the display device 200 faces in the Y-axis direction, projection positions at which the relative position A' (0, 0, 0) and the relative position B' (X2', Y2', Z2') illustrated in FIG. 8A are projected onto an X-Z plane are calculated. A projection position A' (0, 0) illustrated in FIG. 8B represents a projection position calculation result when the relative position A' (0, 0, 0) of the image pickup device 110 is projected onto the X-Z plane, and a projection position B' (X2', Z2') represents a projection position calculation result when the relative position B' (X2', Y2', Z2') of the image pickup device 120 is projected onto the X-Z plane.

In FIG. 8B, since the display device 200 faces in the Y-axis direction, the projection position calculation of projecting the relative position of the image pickup device 110 and the image pickup device 120 calculated by the calculating unit 202 onto the X-Z plane is performed. However, for example, when the display device 200 faces in an X-axis direction, a projection position calculation of projecting the relative position of the image pickup device 110 and the image pickup device 120 onto a Y-Z plane may be performed. In other words, a calculation of projecting the relative position of the image pickup device 110 and the image pickup device 120 onto a plane crossing a direction in which the display device 200 faces at a right angle may be performed as the projection position calculation according to a direction in which the display device 200 faces.

Figure 8C:
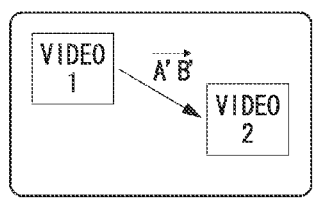

FIG. 8C illustrates a state in which the real-time video 1 acquired from the image pickup device 110 and the real-time video 2 acquired from the image pickup device 120 are displayed on the display region of the display unit 201 of the display device 200 based on the projection position of the image pickup device 110 and the image pickup device 120.

As illustrated in FIG. 8C, the real-time video 1 and the real-time video 2 on the display region of the display unit 201 are arranged to maintain a correlation of a vector expression 4 (hereinafter referred to as a "vector $\overrightarrow{A'B'}$") between the projection position A' (0, 0) of the image pickup device 110 and the projection position B' (X2', Z2') of the image pickup device 120 illustrated in FIG. 8B.

$$\overrightarrow{A'B'} \quad (4)$$

Figure 8D:
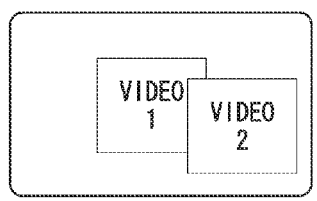

The arrangement of the real-time video in the display region of the display unit 201 may be made such that a correlation between the vectors of the projection positions of the image pickup devices 100 is maintained as described above, and the distance between the real-time video 1 and the real-time video 2 is not limited to the arrangement illustrated in FIG. 8C. For example, as illustrated in FIG. 8D, the real-time video 1 may be arranged and displayed at the center of the display region of the display unit 201. In addition, when the real-time videos overlap each other due to the correlation between the vectors of the projection positions of the image pickup devices 100, the real-time video of one image pickup device 100 which is arranged ahead of a projected axis (the Y axis in FIG. 8B) may be displayed to overlap over the real-time video of another image pickup device 100 which is presented behind the projected axis. In other words, as long as the correlation between the vectors of the projection positions of the image pickup device 110 and the image pickup device 120 is maintained, overlapping may be made such that the real-time video 2 is arranged and displayed in front of the real-time video 1 as illustrated in FIG. 8D.

Next, a method of rotating a real-time video arranged on the display unit 201 of the display device 200 will be described. In FIGS. 8E to 8H, X, Y, and Z represent the longitude, the latitude, and the altitude, respectively.

Figure 8E:
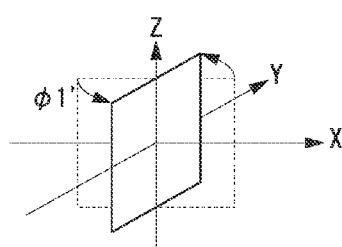
Figure 8F:
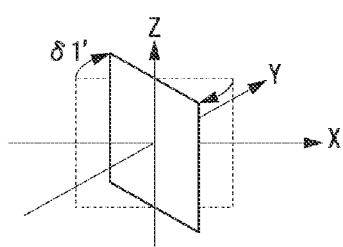

FIG. 8E illustrates a state in which the real-time video 1 rotates about a Z axis based on the relative direction information φ1' of the image pickup device 110 calculated by the calculating unit 202 in step S505 of FIG. 5. FIG. 8F illustrates a state in which the real-time video 2 rotates about the Z axis based on the relative direction information δ1' of the image pickup device 120 calculated by the calculating unit 202 in step S505 of FIG. 5.

Figure 8G:
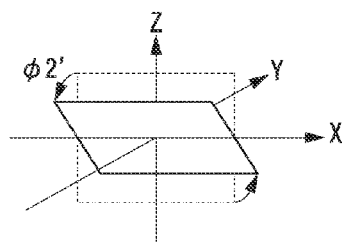
Figure 8H:
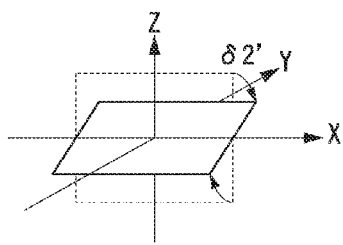

FIG. 8G illustrates a state in which the real-time video 1 rotates about an X axis based on the relative pitch angle φ2' of the image pickup device 110 calculated by the calculating unit 202 in step S505 of FIG. 5. FIG. 8H illustrates a state in which the real-time video 2 rotates about the X axis based on the relative pitch angle δ2' of the image pickup device 120 calculated by the calculating unit 202 in step S505 of FIG. 5.

Figure 8I:
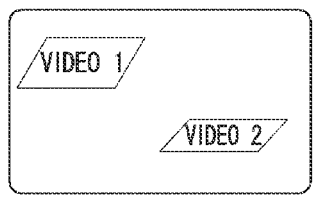

FIG. 8I illustrates a state in which the real-time video 1 and the real-time video 2 are arranged on the display region of the display unit 201 based on the correlation of the vector $\overrightarrow{A'B'}$ between the projection position A' (0, 0) of the image pickup device 110 and the projection position B' (X2', Z2') of the image pickup device 120, the real-time video 1 rotates based on the relative direction information φ1' and the relative pitch angle φ2', and the real-time video 2 rotates based on the relative direction information δ1' and the relative pitch angle δ2'. In other words, the display unit 201 displays a rotation video of a subject.

As described above, the display device 200 of the video display system 1 causes the real-time video 1 acquired from the image pickup device 110 and the real-time video 2 acquired from the image pickup device 120 to be displayed on the display region of the display unit 201 of the display device 200 based on the relative position (the projection position) and the relative direction (the relative direction information and the relative pitch angle) calculated by the calculating unit 202.

Figure 8J:
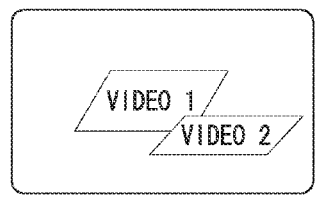

In addition, even when a real-time video is rotated, a display of the real-time video on the display unit 201 is preferably performed to maintain a correlation between the vectors of the projection positions of the image pickup device 100. Thus, for example, as illustrated in FIG. 8J, the rotated real-time video 1 may be arranged at the center of the display region of the display unit 201, and overlapping may be made such that the rotated real-time video 2 is arranged and displayed in front of the real-time video 1.

As described above, in the video display system 1 in accordance with the first preferred embodiment of the present invention, a real-time video is arranged in the display region of the display unit 201 of the display device 200 based on the image capturing position information of the image pickup device 100 that transmits the real-time video. In addition, in the video display system 1 in accordance with the first preferred embodiment of the present invention, a real-time video is rotated and displayed on the display unit 201 based on the shooting direction information in which the image pickup device 100 performs shooting. As a result, even when a plurality of image pickup devices 100 image different subjects and thus a plurality of subjects are present, the display device 200 can display a real-time video such that a relation of the positions of the subjects is visually recognized easily.

Second Preferred Embodiment

Figure 9:
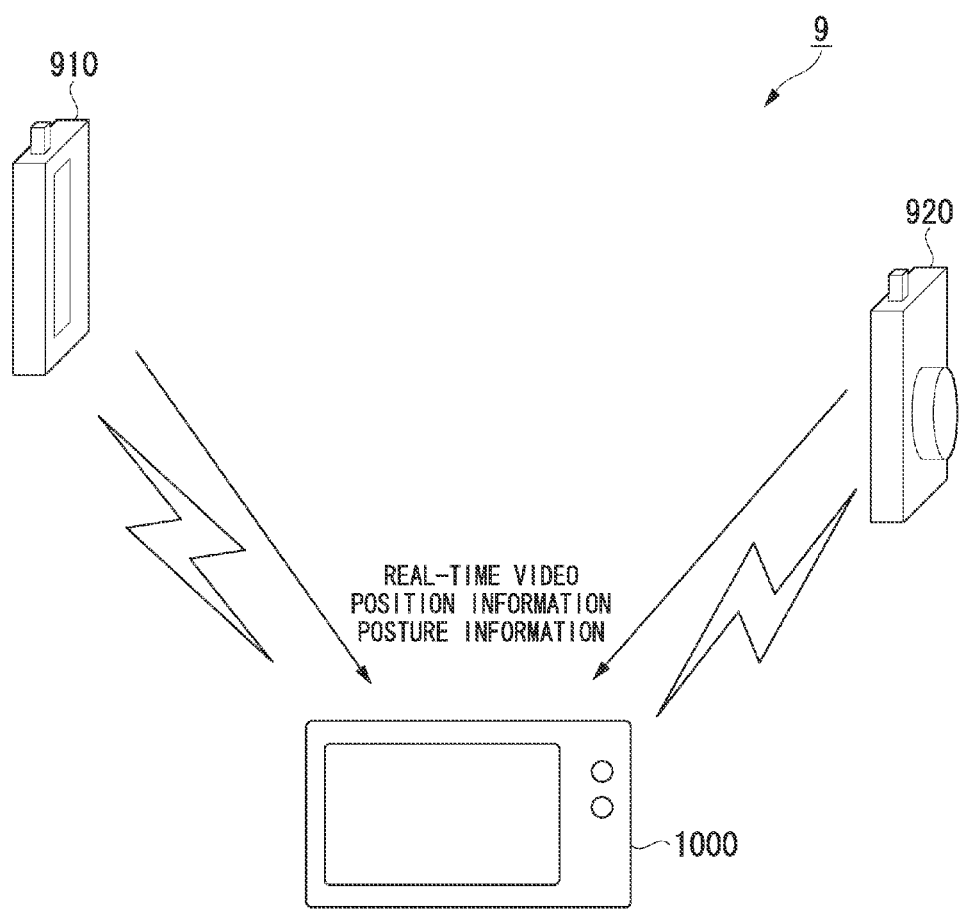
FIG. 9 is a diagram illustrating a schematic configuration of a video display system in accordance with a second preferred embodiment of the present invention.

Next, a second preferred embodiment of the present invention will be described. FIG. 9 is a diagram illustrating a schematic configuration of a video display system in accordance with the second preferred embodiment of the present invention. A video display system 9 illustrated in FIG. 9 causes real-time videos transmitted from image pickup devices to be displayed on a display unit of a display device based on real-time videos transmitted from a plurality of image pickup devices, the image capturing position information and the shooting direction information, and the display direction information of the display device, similarly to the video display system 1 illustrated in FIG. 1.

The video display system 9 illustrated in FIG. 9 includes image pickup devices 910 and 920 (hereinafter referred to as an "image pickup device 900" when representing all image pickup devices together.) and a display device 1000. The video display system 9 illustrated in FIG. 9 is different from the video display system 1 illustrated in FIG. 1 in that the image pickup devices 910 and 920 are connected to the display device 1000 in a wireless manner. Thus, the image pickup device 900 and the display device 1000 have different configurations from the image pickup device 110 illustrated in FIG. 2 and the display device 200 illustrated in FIG. 4.

Figure 10:
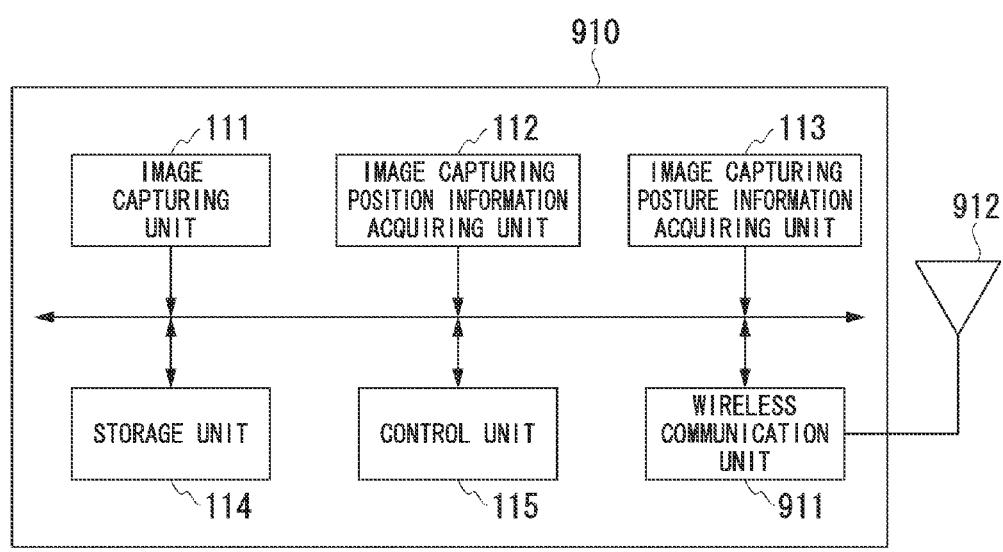
FIG. 10 is a block diagram illustrating a schematic configuration of the image pickup device in the video display system in accordance with the second preferred embodiment of the present invention.

FIG. 10 is a block diagram illustrating a schematic configuration of the image pickup device 910 in the video display system 9 in accordance with the second preferred embodiment of the present invention. As illustrated in FIG. 10, the image pickup device 910 includes an image capturing unit 111, an image capturing position information acquiring unit 112, an image capturing posture information acquiring unit 113, a storage unit 114, a control unit 115, a wireless communication unit 911, and an antenna 912. In the video display system 9 in accordance with the second preferred embodiment of the present invention, the image pickup device 910 has the same configuration as the image pickup device 920.

A difference in a configuration between the image pickup device 910 in accordance with the second preferred embodiment of the present invention and the image pickup device 110 in accordance with the first preferred embodiment of FIG. 2 lies in that the wireless communication unit 911 is provided instead of the data communication unit 116, and the antenna 912 is additionally provided. The difference in the configuration corresponds to the fact that the image pickup device 110 in accordance with the first preferred embodiment of FIG. 2 transmits the image pickup device-specific data to the display device 200 in a wired manner, whereas the image pickup device 910 transmits the image pickup device-specific data to the display device 1000 in a wireless manner. Thus, in the image pickup device 910 and the image pickup device 110 in accordance with the first preferred embodiment of FIG. 2, the same components are denoted by the same reference numerals, and thus a detailed description thereof will not be given here.

The wireless communication unit 911 transmits the image pickup device-specific data (the real-time video, the image capturing position information, and the shooting direction information) stored in the storage unit 114 to the display device 1000 through the antenna 912 under control of the control unit 115.

A difference in an operation between the image pickup device 910 in accordance with the second preferred embodiment of the present invention and the image pickup device 110 in accordance with the first preferred embodiment of FIG. 2 lies in a method of transmitting the image pickup device-specific data to the display device 1000, that is, lies in that the image pickup device-specific data is transmitted in a wireless manner as described above. Thus, an operation of the image pickup device 910 is similar to the data transmission process in the image pickup device 110 of the first preferred embodiment illustrated in FIG. 3, and thus a detailed description thereof will not be provided here.

Figure 11:
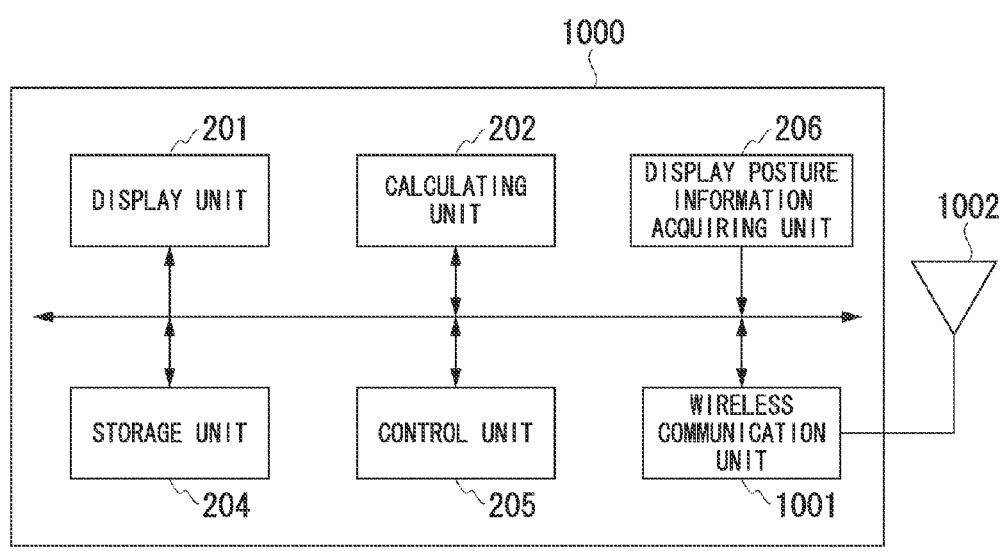
FIG. 11 is a block diagram illustrating a schematic configuration of a display device in the video display system in accordance with the second preferred embodiment of the present invention.

FIG. 11 is a block diagram illustrating a schematic configuration of the display device 1000 in the video display system 9 in accordance with the second preferred embodiment of the present invention. As illustrated in FIG. 11, the display device 1000 includes a display unit 201, a calculating unit 202, a storage unit 204, a control unit 205, a display posture information acquiring unit 206, a wireless communication unit 1001, and an antenna 1002.

A difference in a configuration between the display device 1000 in accordance with the second preferred embodiment of the present invention and the display device 200 in accordance with the first preferred embodiment illustrated in FIG. 4 lies in that the wireless communication unit 1001 is provided instead of the external data acquiring unit 203, and the antenna 1002 is additionally provided. The difference in the configuration corresponds to the fact that the display device 200 in accordance with the first preferred embodiment illustrated in FIG. 4 acquires the image pickup device-specific data from the image pickup device 100 in a wired manner, whereas the display device 1000 acquires the image pickup device-specific data from the image pickup device 900 in a wireless manner. Thus, in the display device 1000 and the display device 200 in accordance with the first preferred embodiment illustrated in FIG. 4, the same components are denoted by the same reference numerals, and thus a detailed description thereof will not be provided here.

The wireless communication unit 1001 acquires the image pickup device-specific data (the real-time video, the image capturing position information, and the shooting direction information) from the image pickup devices 900 in the video display system 9 through the antenna 1002 under control of the control unit 205. The wireless communication unit 1001 outputs each piece of the acquired image pickup device-specific data to the storage unit 204.

A difference in an operation between the display device 1000 in accordance with the second preferred embodiment of the present invention and the display device 200 in accordance with the first preferred embodiment illustrated in FIG. 4 lies in a method of acquiring the image pickup device-specific data from the image pickup device 900, that is, lies in that the image pickup device-specific data is acquired in a wireless manner as described above. Thus, an operation of the display device 1000 is similar to the display process in the display device 200 of the first preferred embodiment described with reference to FIGS. 5 to 8, and thus a detailed description thereof will not be provided here.

As described above, in the video display system 9 in accordance with the second preferred embodiment of the present invention, a real-time video is displayed on the display unit 201 of the display device 1000 based on the image capturing position information of the image pickup device 900 that transmits the real-time video, similarly to the video display system 1 of the first preferred embodiment. Thus, the display device 1000 can display a real-time video such that the relation of the positions of different subjects imaged by a plurality of image pickup devices 900 is visually recognized easily, similarly to the display device 200 in the video display system 1 of the first preferred embodiment.

In the video display system 9 in accordance with the second preferred embodiment of the present invention, the image pickup device 900 is connected to the display device 1000 in a wireless manner. Thus, it is easy to transport the display device 1000, and a real-time video can be displayed such that a relation of the positions of different subjects is more easily recognized than in the display device 200 of the video display system 1 of the first preferred embodiment.

Third Preferred Embodiment

Next, a third preferred embodiment of the present invention will be described. A video display system in accordance with the third preferred embodiment of the present invention is different from the video display system 1 of the first preferred embodiment and the video display system 9 of the second preferred embodiment in a reference used to display a real-time video on a display device. More specifically, the display device displays a real-time video acquired from the image pickup device of the video display system in accordance with the third preferred embodiment of the present invention based on the position of the display device, that is, a display position. Thus, in the video display system in accordance with the third preferred embodiment of the present invention, the display device 1000 is different in configuration from the display device 200 illustrated in FIG. 4. Further, in the video display system in accordance with the third preferred embodiment of the present invention, the image pickup device has the same configuration as the image pickup device 110 illustrated in FIG. 2, and thus a detailed description thereof will not be provided here.

Figure 12:
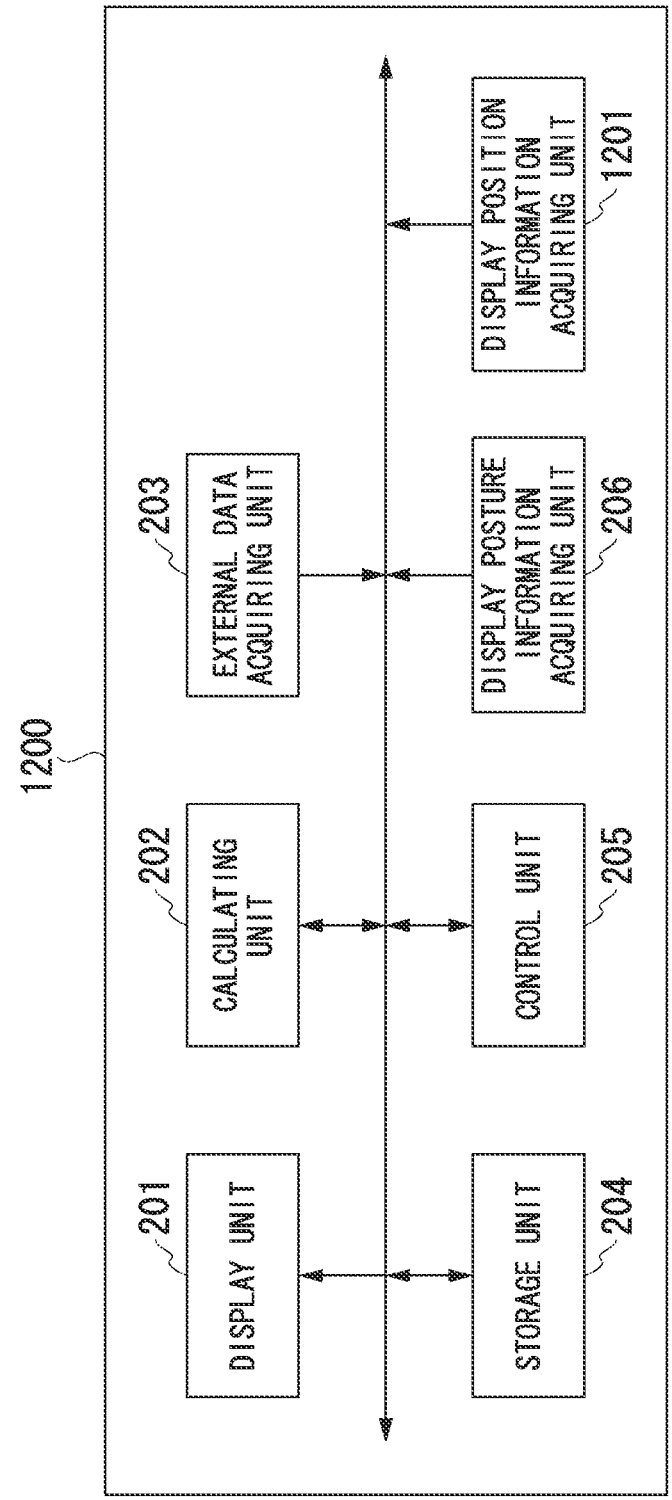
FIG. 12 is a block diagram illustrating a schematic configuration of a display device of the video display system in accordance with a third preferred embodiment of the present invention.

FIG. 12 is a block diagram illustrating a schematic configuration of a display device of the video display system in accordance with the third preferred embodiment of the present invention. As illustrated in FIG. 12, the display device 1200 includes a display unit 201, a calculating unit 202, an external data acquiring unit 203, a storage unit 204, a control unit 205, a display posture information acquiring unit 206, and a display position information acquiring unit 1201.

A difference in a configuration between the display device 1200 in accordance with the third preferred embodiment of the present invention and the display device 200 in accordance with the first preferred embodiment illustrated in FIG. 4 lies in that the display position information acquiring unit 1201 is additionally provided. The remaining components are the same as in the display device 200 in accordance with the first preferred embodiment illustrated in FIG. 4. Thus, the same components are denoted by the same reference numerals, and a detailed description thereof will not be provided here.

The display position information acquiring unit 1201 detects an installation position of the display device 1200, that is, the display position, under control of the control unit 205, and outputs display position information representing the detected position of the display device 1200 to the storage unit 204. The display position information detected by the display device 1200 is used as a reference to display a real-time video on the display unit 201 of the display device 1200.

The display position information detected by the display position information acquiring unit 1201 represents an absolute position at which the display device 1200 is installed and includes at least the longitude, the latitude, and the altitude. For example, the display position information acquiring unit 1201 may be configured to include a GPS sensor. In this case, the display position information may include at least the longitude, the latitude, and the altitude detected by the GPS sensor.

The calculating unit 202 calculates the relative position and the relative direction based on the display direction information and the display position information of the display device 1200 stored in the storage unit 204 and the image capturing position information and the shooting direction information of the image pickup devices (for example, the image pickup device 110 and the image pickup device 120 in the first preferred embodiment) included in the image pickup device-specific data stored in the storage unit 204 under control of the control unit 205.

Next, an operation of the display device 1200 in accordance with the third preferred embodiment of the present invention will be described. The display process in the display device 1200 in accordance with the third preferred embodiment of the present invention is similar to the flowchart of FIG. 5 illustrating the display process in the display device 200 of the first preferred embodiment, and thus a detailed description will not be provided here. However, the method of calculating the relative position described in step S504 of FIG. 5 is performed as will be described below. In addition, in the display device 1200 in accordance with the third preferred embodiment of the present invention, the determination of the number of pieces of data in step S502 of FIG. 5 is performed based on the total number of pieces of data including the display position information of the display device 1200.

In the following description, the video display system 1 of the first preferred embodiment illustrated in FIG. 1 is assumed to include the display device 1200 in accordance with the third preferred embodiment of the present invention instead of the display device 200. In addition, the video display system according to the display device 1200 in accordance with the third preferred embodiment of the present invention may be connected to each image pickup device in a wireless manner, similarly to the video display system 9 of the second preferred embodiment.

Here, when the notice representing that the display direction information has been stored in the storage unit 204 is received from the display posture information acquiring unit 206, in step S504, the control unit 205 issues a command (a relative position calculation command) causing the calculating unit 202 to calculate the relative position of the image pickup devices (the image pickup device 110 and the image pickup device 120) based on the display position information of the display device 1200. Upon receiving the relative position calculation command from the control unit 205, the calculating unit 202 reads the display position information of the display device 1200 stored in the storage unit 204 and the image capturing position information of the image pickup devices (the image pickup device 110 and the image pickup device 120) included in the image pickup device-specific data stored in the storage unit 204, and calculates the relative position. Then, the calculating unit 202 causes a result of the calculated relative position to be stored in the storage unit 204. The calculating unit 202 notifies the control unit 205 of the fact that the relative position has been stored in the storage unit 204.

Figure 13A:
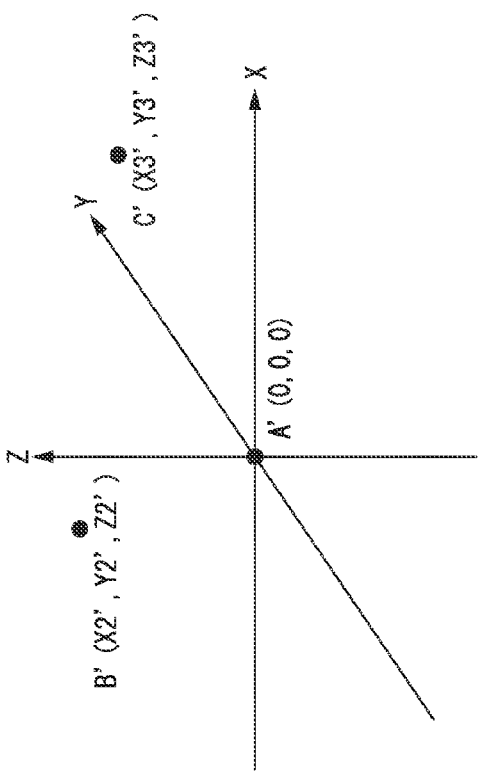
FIGS. 13A and 13B are diagram for describing an example of a method of calculating the relative position in the video display system according to the display device in accordance with the third preferred embodiment of the present invention.
Figure 13B:
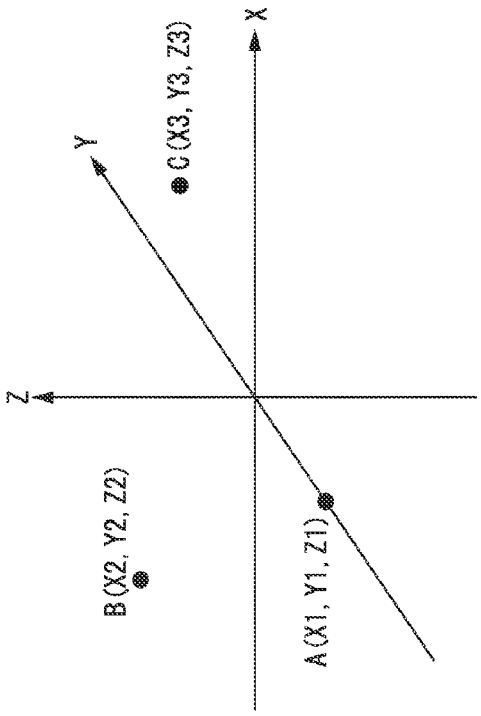

Here, a method of calculating the relative position through the calculating unit 202 will be described. FIGS. 13A and 13B are diagram for describing an example of a method of calculating the relative position in the video display system according to the display device 1200 in accordance with the third preferred embodiment of the present invention. In FIGS. 13A and 13B, X, Y, and Z represent the longitude, the latitude, and the altitude, respectively. FIG. 13A illustrates a positional relation among the display device 1200, the image pickup device 110, and the image pickup device 120 based on the display position information and the image capturing position information. FIG. 13B illustrates a positional relation among the display device 1200, the image pickup device 110, and the image pickup device 120 when the position of the display device 1200 is used as a reference.

More specifically, the position information A (X1, Y1, Z1) illustrated in FIG. 13A is the display position information of the display device 1200 detected by the display position information acquiring unit 1201. Position information B (X2, Y2, Z2) and position information C (X3, Y3, Z3) are the image capturing position information in the image pickup device 110 and the image capturing position information in the image pickup device 120, respectively, and are the image capturing position information included in the image pickup device-specific data acquired from the image pickup devices 100 in step S501 of FIG. 5.

The calculating unit 202 performs the same calculation as in Formula (1) in response to the relative position calculation command from the control unit 205 and calculates the relative position of the image pickup device 110 and the image pickup device 120 when the position of the display device 1200 is used as a reference. FIG. 13B illustrates a relative position B' (X2', Y2', Z2') corresponding to the position information B (X2, Y2, Z2) of the image pickup device 110 and a relative position C' (X3', Y3', Z3') corresponding to the position information C (X3, Y3, Z3) of the image pickup device 120 when the position information A (X1, Y1, Z1) of the display device 1200 is used as a reference (a relative position A' (0, 0, 0)).

Thereafter, the control unit 205 similarly performs the display process as the display process in the display device 200 of the first preferred embodiment described with reference to FIG. 5 and FIGS. 7A to 8J, and then causes the real-time video 1 acquired from the image pickup device 110 and the real-time video 2 acquired from the image pickup device 120 to be simultaneously displayed on the display region of the display unit 201 of the display device 1200 based on the display position information of the display device 1200.

As described above, in the video display system in accordance with the third preferred embodiment of the present invention, a real-time video acquired from the image pickup device is displayed on the display unit 201 of the display device 1200 based on the display position information of the display device 1200. Thus, the display device 1200 can display a real-time video such that a relation of the positions of different subjects which are imaged by a plurality of image devices is visually recognized easily, similarly to the display device 200 of the video display system 1 of the first preferred embodiment or the display device 1000 of the video display system 9 of the second preferred embodiment.

In addition, in the video display system according to the display device 1200 in accordance with the third preferred embodiment of the present invention, a real-time video is displayed using the position of the display device 1200 as a reference. Thus, a real-time video can be displayed such that a relation of the positions of the subjects is more easily recognized than in the display device 200 of the video display system 1 of the first preferred embodiment or the display device 1000 of the video display system 9 of the second preferred embodiment.

Fourth Preferred Embodiment

Next, a fourth preferred embodiment of the present invention will be described. FIG. 14 is a diagram illustrating a schematic configuration of a video display system in accordance with the fourth preferred embodiment of the present invention. A video display system 14 illustrated in FIG. 14 causes real-time videos transmitted from image pickup devices to be displayed on a display unit of a display device based on real-time videos transmitted from a plurality of image pickup devices, the image capturing position information, the shooting direction information and the display direction information of the display device, similarly to the video display system 1 illustrated in FIG. 1. In the video display system 14 illustrated in FIG. 14, the display device also includes an image capturing unit, and a real-time video imaged by the display device is also displayed.

The video display system 14 illustrated in FIG. 14 includes image pickup devices 1410 and 1420 (hereinafter referred to as an "image pickup device 1400" when representing all image pickup devices together.) and a display device 1500. The video display system 14 illustrated in FIG. 14 is different from the video display system 1 illustrated in FIG. 1 in that the display device 1500 also images a real-time video.

In the video display system 14 illustrated in FIG. 14, a real-time video 1 imaged by the display device 1500 is displayed on a display region 1501 of the display unit 201, a real-time video 2 acquired from the image pickup device 1410 is displayed on a display region 1511 of the display unit 201, and a real-time video 3 acquired from the image pickup device 1420 is displayed on a display region 1521 of the display unit 201.

In the video display system 14, the display device 1500 also images a real-time video as described above. Thus, the display device 1500 has a different configuration from the configuration of the display device 200 illustrated in FIG. 4.

Figure 15:
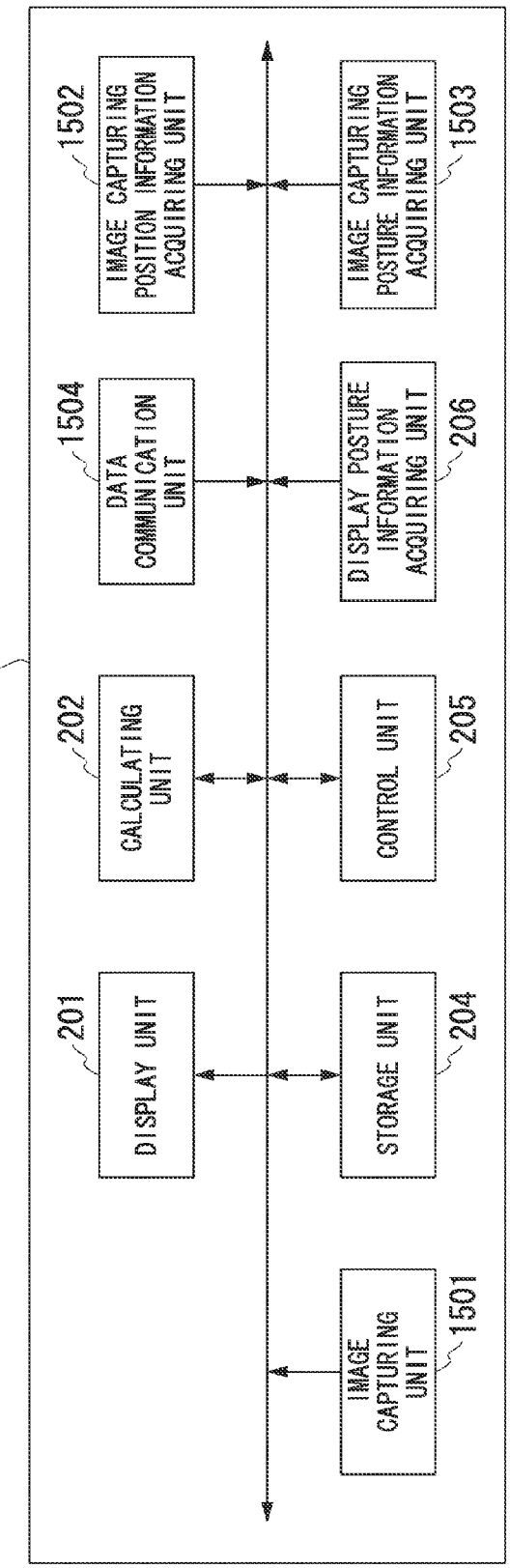
FIG. 15 is a block diagram illustrating a schematic configuration of the display device in the video display system in accordance with the fourth preferred embodiment of the present invention.

FIG. 15 is a block diagram illustrating a schematic configuration of the display device 1500 in the video display system 14 in accordance with the fourth preferred embodiment of the present invention. As illustrated in FIG. 14, the display device 1500 includes a display unit 201, a calculating unit 202, a storage unit 204, a control unit 205, a display posture information acquiring unit 206, an image capturing unit 1501, an image capturing position information acquiring unit 1502, an image capturing posture information acquiring unit 1503, and a data communication unit 1504.

A difference in a configuration between the display device 1500 in accordance with the fourth preferred embodiment of the present invention and the display device 200 in accordance with the first preferred embodiment illustrated in FIG. 4 lies in that the data communication unit 1504 is provided instead of the external data acquiring unit 203, and the image capturing unit 1501, the image capturing position information acquiring unit 1502, and the image capturing posture information acquiring unit 1503 are additionally provided. The remaining components are similar to the corresponding components of the display device 200 in accordance with the first preferred embodiment illustrated in FIG. 4. Thus, the same components are denoted by the same reference numerals, and a detailed description thereof will not be provided here.

For example, the image capturing unit 1501 includes an imager that images a subject, images a real-time video under control of the control unit 205, and outputs the imaged real-time video to the storage unit 204.

The image capturing position information acquiring unit 1502 detects an installation position of the display device 1500, that is, the image capturing position under control of the control unit 205, and outputs image capturing position information representing the detected position of the display device 1500 to the storage unit 204.

The image capturing position information detected by the image capturing position information acquiring unit 1502 is information representing an absolute position at which the display device 1500 is installed, and includes at least the longitude, the latitude, and the altitude. For example, the image capturing position information acquiring unit 1502 may be configured to include a GPS sensor. In this case, the image capturing position information may include at least the longitude, the latitude, and the altitude detected by the GPS sensor.

The image capturing posture information acquiring unit 1503 detects a posture with which the display device 1500 performs shooting, that is, the shooting direction, under control of the control unit 205, and outputs shooting direction information representing the detected posture of the display device 1500 to the storage unit 204.

The shooting direction information detected by the image capturing posture information acquiring unit 1503 includes the image capturing direction information and the image capturing pitch angle information with respect to a direction in which an optical axis of the image capturing unit 1501 of the display device 1500 faces. An inverse vector of a vector representing the direction in which the optical axis of the image capturing unit 1501 of the display device 1500 faces matches a normal vector vertical to the surface of the display unit 201 of the display device 1500. In other words, the shooting direction information and the display direction information match each other when inverted. For example, the image capturing posture information acquiring unit 1503 may be configured to include a magnetic field sensor and an acceleration sensor. In this case, the shooting direction information may include at least image capturing direction information detected by the magnetic field sensor and image capturing pitch angle information detected by the acceleration sensor.

The data communication unit 1504 transmits the real-time video, the image capturing position information, and the shooting direction information stored in the storage unit 204 to the display device under control of the control unit 205. The data communication unit 1504 acquires image pickup device-specific data (the real-time video, the image capturing position information, and the shooting direction information) from each of the image pickup devices 1400 in the video display system 14 under control of the control unit 205. The data communication unit 1504 outputs each piece of the acquired image pickup device-specific data to the storage unit 204.

The control unit 205 causes the real-time video imaged by the image capturing unit 1501, which is stored in the storage unit 204 to be displayed on the display region 1501 positioned at the center of the display unit 201. In other words, the control unit 205 causes the real-time video imaged by the display device 1500 to be displayed at the central position with a larger size than the other real-time videos. In addition, the control unit 205 causes real-time videos included in a plurality of pieces of image pickup device-specific data acquired from the image pickup devices 1400 which are stored in the storage unit 204 to be displayed on the display unit 201 in a state in which a positional correlation between the image pickup device 1410 and the image pickup device 1420 is maintained, similarly to the display device 200 in accordance with the first preferred embodiment illustrated in FIG. 4 (see FIG. 14).

A difference in an operation between the display device 1500 in accordance with the fourth preferred embodiment of the present invention and the display device 200 in accordance with the first preferred embodiment illustrated in FIG. 4 lies in that a real-time video imaged by the display device 1500 is displayed as described above. Thus, an operation of the display device 1500 is almost similar to the display process of the display device 200 in accordance with the first preferred embodiment described with reference to FIGS. 5 to 8J, and thus a detailed description will not be made. The video display system 14 according to the display device 1500 in accordance with the fourth preferred embodiment of the present invention may be connected with the image pickup device 1400 in a wireless manner, similarly to the video display system 9 of the second preferred embodiment.

The display device 1500 in accordance with the fourth preferred embodiment of the present invention may further include the display position information acquiring unit, similarly to the display device 1200 in accordance with the third preferred embodiment, and may be configured to display the real-time video imaged by the display device 1500 and the real-time video imaged by the image pickup device 1400 based on the image capturing position information of the image pickup device 1400 when the display position information of the display device 1500 acquired by the display position information acquiring unit is used as a reference. In this case, the display position information acquired by the display position information acquiring unit matches the image capturing position information acquired by the image capturing position information acquiring unit 1502.

The display device 1500 in accordance with the fourth preferred embodiment of the present invention has been described in connection with the example in which the three real-time videos (the real-time video imaged by the display device 1500 and the real-time videos imaged by the image pickup devices (for example, the image pickup device 110 and the image pickup device 120 of the third preferred embodiment)) are displayed. However, the real-time video displayed on the display device 1500 is not limited to the fourth preferred embodiment of the present invention. For example, the display device 1500 may display only two real-time videos (the real-time video imaged by the display device 1500 and the real-time video imaged by the image pickup device (for example, the image pickup device 110 of the third preferred embodiment)).

As described above, in the video display system 14 in accordance with the fourth preferred embodiment of the present invention, the real-time video imaged by the display device 1500 is arranged on the display region of the display unit 201 of the display device 1500. In addition, in the video display system 14 in accordance with the fourth preferred embodiment of the present invention, similarly to the video display system 1 of the first preferred embodiment, a real-time video is displayed on the display unit 201 based on the image capturing position information of the image pickup device 1400 that transmits the real-time video. Thus, the display device 1500 can display a real-time video such that a relation of the positions of different subjects imaged by a plurality of image pickup devices 1400 is visually recognized easily, similarly to the display device 200 of the video display system 1 of the first preferred embodiment or the display device 1000 of the video display system 9 of the second preferred embodiment.

In addition, in the video display system 14 according to the display device 1500 in accordance with the fourth preferred embodiment of the present invention, a real-time video imaged by the display device 1500 is simultaneously displayed. Thus, a real-time video can be displayed such that a relation of the positions of subjects is more easily recognized than in the display device 200 of the video display system 1 of the first preferred embodiment or the display device 1000 of the video display system 9 of the second preferred embodiment.

Fifth Preferred Embodiment

Next, a fifth preferred embodiment of the present invention will be described. In a video display system in accordance with the fifth preferred embodiment of the present invention, a display device and an image pickup device are configured to have the same configuration. In the following description, a display device and an image pickup device are referred to as an "information terminal." Each information terminal is configured to perform a process which is performed by each of the display device and the image pickup device in the first to fourth preferred embodiments. In addition, the information terminals can transmit/receive the image pickup device-specific data to/from each other by two-way communication.

Figure 16:
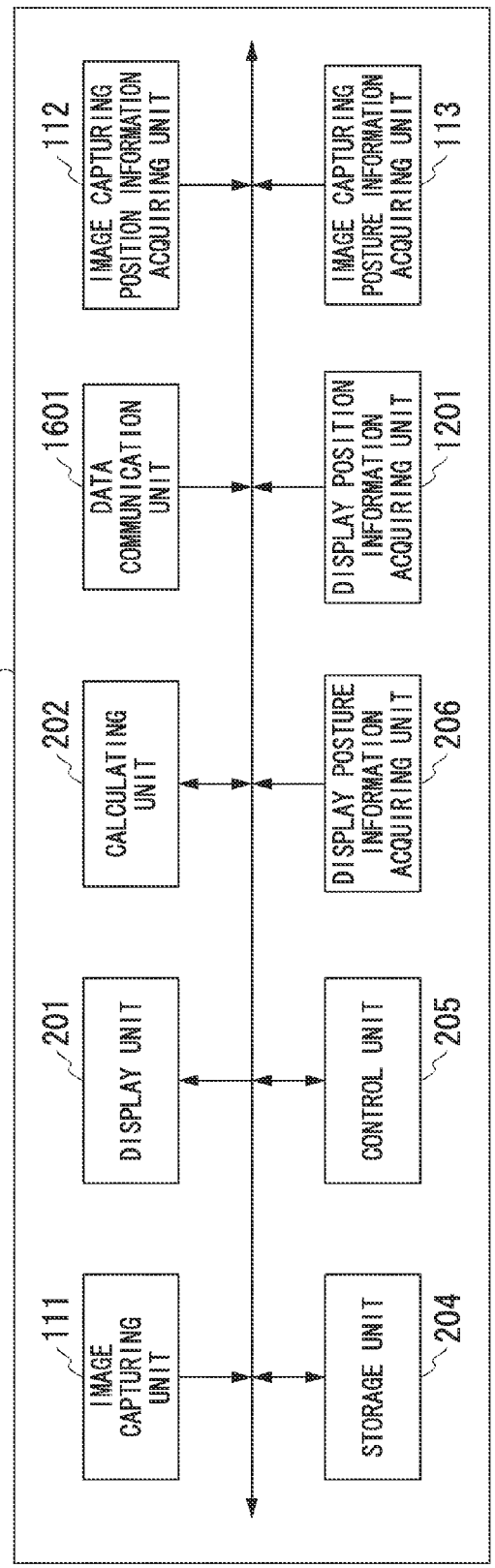
FIG. 16 is a block diagram illustrating a schematic configuration of an information terminal in the video display system in accordance with a fifth preferred embodiment of the present invention.

FIG. 16 is a block diagram illustrating a schematic configuration of an information terminal in the video display system in accordance with the fifth preferred embodiment of the present invention. As illustrated in FIG. 16, the information terminal 1600 includes an image capturing unit 111, a display unit 201, a calculating unit 202, a storage unit 204, a control unit 205, a display posture information acquiring unit 206, a display position information acquiring unit 1201, an image capturing position information acquiring unit 112, an image capturing posture information acquiring unit 113, and a data communication unit 1601.

A difference in a configuration between the information terminal 1600 in accordance with the fifth preferred embodiment of the present invention and, for example, the display device 200 in accordance with the first preferred embodiment illustrated in FIG. 4 lies in that the data communication unit 1601 is provided instead of the external data acquiring unit 203, and the image capturing unit 111, the display position information acquiring unit 1201, the image capturing position information acquiring unit 112, and the image capturing posture information acquiring unit 113 are additionally provided. However, the image capturing unit 111, the image capturing position information acquiring unit 112, and the image capturing posture information acquiring unit 113 have the same components as the image pickup device 110 in accordance with the first preferred embodiment of FIG. 2. In addition, the display position information acquiring unit 1201 has the same components as the display device 1200 in accordance with the third preferred embodiment illustrated in FIG. 12. Thus, the same components of the information terminal 1600 which are the same as in the display device 200 in accordance with the first preferred embodiment illustrated in FIG. 4, the display device 1200 in accordance with the third preferred embodiment illustrated in FIG. 12, or the image pickup device 110 in accordance with the first preferred embodiment of FIG. 2 are denoted by the same reference numerals, and thus a detailed description will not be made.

The data communication unit 1601 performs data communication with the data communication unit 1601 installed in another information terminal 1600 which is a component of the video display system in accordance with the fifth preferred embodiment of the present invention in a wired or wireless manner. The data communication unit 1601 transmits the image pickup device-specific data (the real-time video, the image capturing position information, and the shooting direction information) imaged or detected by the information terminal 1600 which is stored in the storage unit 204 under control of the control unit 205 to the remaining information terminals 1600 in the video display system in accordance with the fifth preferred embodiment of the present invention.

In addition, the data communication unit 1601 acquires the image pickup device-specific data (the real-time video, the image capturing position information, and the shooting direction information) from the remaining information terminals 1600 in the video display system in accordance with the fifth preferred embodiment of the present invention. Then, the data communication unit 1601 outputs each piece of the acquired image pickup device-specific data to the storage unit 204.

A difference in an operation between the information terminal 1600 in accordance with the fifth preferred embodiment of the present invention and each of the display device and the image pickup device in the first to fourth preferred embodiments lies in that the image pickup device-specific data is transmitted to or received from each of the remaining information terminals 1600 in the video display system in accordance with the fifth preferred embodiment of the present invention. In other words, each of the information terminals 1600 in the video display system in accordance with the fifth preferred embodiment of the present invention performs either the same operation as the display process in the display device in accordance with any of the first to fourth preferred embodiments or the data transmission process in the image pickup device in accordance with any of the first to fourth preferred embodiments. Thus, a detailed description related to an operation of the information terminal 1600 will not be provided here.

As described above, in the video display system in accordance with the fifth preferred embodiment of the present invention, similarly to the video display system in accordance with any of the first to fourth preferred embodiments, a real-time video acquired from another information terminal 1600 is displayed on the display unit 201 of the own information terminal 1600 based on the image capturing position information of another information terminal 1600. Thus, the information terminal 1600 can display a real-time video such that a relation of the positions of difference subjects imaged by a plurality of other information terminals 1600 is visually recognized easily, similarly to the display device in the video display system of any of the first to fourth preferred embodiments. In addition, the same effects as in the video display system of any of the first to fourth preferred embodiments can be obtained.

Further, in the video display system according to the information terminal 1600 in accordance with the fifth preferred embodiment of the present invention, the information terminals 1600 in the video display system in accordance with the fifth preferred embodiment of the present invention transmit/receive the image pickup device-specific data to/from each other by two-way communication. All of the information terminals 1600 in the video display system in accordance with the fifth preferred embodiment of the present invention display a real-time video. Thus, a real-time video can be displayed such that a relation of the positions of subjects is easily recognized no matter what information terminal 1600 is used.

As described above, according to the exemplary preferred embodiments of the present invention, real-time videos imaged by a plurality of image pickup devices (information terminals) in the video display system are displayed on the display devices (the information terminals) in the video display system based on the image capturing position information and the shooting direction information of the image pickup devices (the information terminals). In other words, according to the exemplary preferred embodiments of the present invention, a view display or a multi-view display of a real-time video is performed in a state in which a relation of the positions or directions of the image pickup devices (the information terminals) that image a subject is reflected. Thus, even when a plurality of image pickup devices (the information terminals) image different subjects and thus a plurality of subjects are present, a relation of the positions of the subjects can be visually recognized from the real-time videos displayed on the display device (the information terminal).

In addition, according to the exemplary preferred embodiments of the present invention, a real-time video imaged by the image pickup device (the information terminal) is displayed based on the posture or position of the display device (the information terminal). Thus, the relation of the positions of the subjects can be more accurately recognized.

The present preferred embodiment has been described in connection with the configuration in which the control unit 205 of the display device includes a display control unit that controls a display method of a real-time video displayed on the display unit 201, that is, controls an arrangement of real-time videos in the display region and a rotation method of a real-time video based on the relative position and the relative direction calculated by the calculating unit 202 as its internal component. However, a configuration of controlling a display method of a real-time video displayed on the display unit 201 is not limited to the preferred embodiments for embodying the present invention. For example, a display control unit that controls a display method of a real-time video based on the relative position and the relative direction calculated by the calculating unit 202 may be installed in the display unit 201 of the display device.

Further, the present preferred embodiment has been described in connection with the example in which the calculating unit 202 and the control unit 205 of the display device have different components. However, a configuration of the components in the display device is not limited to the preferred embodiments for embodying the present invention. For example, a configuration in which the functions of the calculating unit 202 and the control unit 205 of the display device can be implemented by a single processing device such as a central processing unit (CPU) may be provided. Thus, a configuration in which processing including the function of the display control unit is performed by a single processing device, that is, a calculation of the relative position and the relative direction and control of a display method of a real-time video are performed by a single processing device can be provided.

In addition, the present preferred embodiment has been described in connection with the example in which the image pickup device-specific data includes the real-time video, the image capturing position information, and the shooting direction information. However, a data configuration of the image pickup device-specific data is not limited to the preferred embodiments for embodying the present invention. For example, a real-time video of one second may include a plurality of frames. At this time, when each piece of the image pickup device-specific data is configured such that each frame is associated with the image capturing position information and the shooting direction information, a data amount of the image pickup device-specific data increases. In this regard, for example, each piece of the image pickup device-specific data is configured such that the image capturing position information and the shooting direction information are associated only with a predetermined frame among a plurality of frames configuring a real-time video of one second, and the image capturing position information and the shooting direction information are not associated with the remaining frames. In other words, a configuration in which the image capturing position information and the shooting direction information are transmitted once a second may be provided. As a result, the data amount of each piece of the image pickup device-specific data decreases, and a load of communication between the image pickup device (the information terminal) and the display device (the information terminal) can be reduced. In this case, for example, the determination of the number of pieces of data in step S502 of FIG. 5 may be performed based on the number of real-time videos included in the image pickup device-specific data.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A display device comprising:
   a storage unit configured to store, in association with one another, a video signal of a subject, image capturing position information representing an image capturing position when the subject is imaged, and shooting direction information representing a shooting direction when the subject is imaged;
   a display unit configured to display a video of the subject;
   a display posture information acquiring unit configured to acquire display direction information representing a display direction in which the display unit displays the video of the subject;
   a calculating unit configured to calculate a relative positional relation of a plurality of image capturing positions in a stereoscopic space based on the image capturing position information stored in the storage unit, and to calculate a relative directional relation of a plurality of shooting directions in the display direction of the display unit based on the shooting direction information stored in the storage unit and the display direction information acquired by the display posture information acquiring unit; and
   a control unit configured to cause the display unit to display a rotation video obtained by rotating the video of the subject corresponding to the video signal stored in the storage unit according to the relative directional relation calculated by the calculating unit at a position at which videos of a plurality of subjects to be displayed on the display unit maintain the relative positional relation in a display region of the display unit when videos of the subjects respectively corresponding to a plurality of video signals stored in the storage unit are displayed on the display unit.

2. The display device according to claim 1, further comprising:
   a data communication unit configured to acquire the video signal of the subject, the image capturing position information, and the shooting direction information from an image capturing terminal that has imaged the subject,
   wherein the storage unit stores the video signal, the image capturing position information, and the shooting direction information acquired by the data communication unit.

3. The display device according to claim 1,
   wherein the calculating unit calculates the relative positional relation based on the image capturing position information associated with one video signal among a plurality of video signals stored in the storage unit.

4. The display device according to claim 1,
   wherein the shooting direction information acquired by the data communication unit includes direction information and pitch angle information, and the calculating unit calculates the relative directional relation based on the direction information and the pitch angle information.

5. The display device according to claim 1,
   wherein the control unit uses a surface crossing the display direction at a right angle as a surface of the display region, and causes the rotation video to be displayed on the surface of the display region at a position onto which the relative positional relation is projected.

6. The display device according to claim 2,
   wherein the data communication unit acquires the video signal, the image capturing position information, and the shooting direction information by wireless communication.

7. The display device according to claim 1, further comprising:
   a display position information acquiring unit configured to acquire display device position information representing a display position when the display unit displays the video of the subject,
   wherein the calculating unit calculates the relative positional relation using the display position as a reference based on display device position information acquired by the display position information acquiring unit and the image capturing position information stored in the storage unit.

8. The display device according to claim 6,
   wherein the control unit causes one rotation video used as a reference to be displayed at a central position of the display region and causes another rotation video to be displayed at a position at which the relative positional relation with the rotation video used as the reference is maintained.

9. The display device according to claim 1, further comprising:
   an image capturing unit configured to image the subject and output the video signal;

an image capturing position information acquiring unit configured to acquire image capturing position information representing an image capturing position when the image capturing unit images the subject; and an image capturing posture information acquiring unit configured to acquire shooting direction information representing a shooting direction when the image capturing unit images the subject, wherein the storage unit stores a video signal output from the image capturing unit in association with the image capturing position information acquired by the image capturing position information acquiring unit and the shooting direction information acquired by the image capturing posture information acquiring unit.

10. The display device according to claim 9,
wherein the control unit causes a rotation video corresponding to the video of the subject imaged by the image capturing unit to be displayed at a central position of the display region.

11. The display device according to claim 9,
wherein the data communication unit transmits a video signal output from the image capturing unit, the image capturing position information acquired by the image capturing position information acquiring unit, and the shooting direction information acquired by the image capturing posture information acquiring unit to an external terminal.

12. An image pickup device,
wherein a device that comprises:
a storage unit that stores, in association with one another, a video signal of a subject, image capturing position information representing an image capturing position at which the subject is imaged, and shooting direction information representing a shooting direction in which the subject is imaged;
a display unit that displays a video of the subject;
a display posture information acquiring unit that acquires display direction information representing a display direction in which the display unit displays the video of the subject;
a calculating unit that calculates a relative positional relation of a plurality of image capturing positions in a stereoscopic space based on the image capturing position information stored in the storage unit, and calculates a relative directional relation of a plurality of shooting directions in the display direction of the display unit based on the shooting direction information stored in the storage unit and the display direction information acquired by the display posture information acquiring unit; and
a control unit that displays a rotation video obtained by rotating the video of the subject corresponding to the video signal stored in the storage unit according to the relative directional relation calculated by the calculating unit at a position at which videos of a plurality of subjects to be displayed on the display unit maintain the relative positional relation in a display region of the display unit when videos of the subjects respectively corresponding to a plurality of video signals stored in the storage unit are displayed on the display unit;
is defined as a display device,
the image pickup device comprising:
an image capturing unit that images a subject and outputs a video signal of the subject;
an image capturing position information acquiring unit that acquires image capturing position information representing an image capturing position at which the image capturing unit images the subject;
an image capturing posture information acquiring unit that acquires shooting direction information representing a shooting direction in which the image capturing unit images the subject; and
a data communication unit that transmits the video signal output from the image capturing unit, the image capturing position information acquired by the image capturing position information acquiring unit, and the shooting direction information acquired by the image capturing posture information acquiring unit to the display device.

13. The image pickup device according to claim 12,
wherein the data communication unit transmits the video signal, the image capturing position information, and the shooting direction information to the display device by wireless communication.

14. A video display system that displays a video of a subject, comprising:
a plurality of image capturing units, each of which images the subject and outputs a video signal corresponding to the subject;
an image capturing position information acquiring unit that acquires image capturing position information representing an image capturing position at which the image capturing unit images the subject;
an image capturing posture information acquiring unit that acquires shooting direction information representing a shooting direction in which the image capturing unit images the subject;
a display unit that displays the video of the subject;
a display posture information acquiring unit that acquires display direction information representing a display direction in which the display unit displays the video of the subject;
a storage unit that stores, in association with one another, the video signal output from the image capturing unit, the image capturing position information acquired by the image capturing position information acquiring unit, and the shooting direction information acquired by the image capturing posture information acquiring unit;
a calculating unit that calculates a relative positional relation of a plurality of image capturing positions in a stereoscopic space based on the image capturing position information stored in the storage unit, and calculates a relative directional relation of a plurality of shooting directions in the display direction of the display unit based on the shooting direction information stored in the storage unit and the display direction information acquired by the display posture information acquiring unit; and
a control unit that displays a rotation video obtained by rotating the video of the subject corresponding to the video signal stored in the storage unit according to the relative directional relation calculated by the calculating unit at a position at which videos of a plurality of subjects to be displayed on the display unit maintain the relative positional relation in a display region of the display unit when videos of the subjects respectively corresponding to a plurality of video signals stored in the storage unit are displayed on the display unit.

15. The video display system according to claim 14, comprising:
a plurality of image capturing terminals, each of which includes the image capturing unit, the image capturing position information acquiring unit, and the image capturing posture information acquiring unit; and a display terminal that includes the display unit, the display posture information acquiring unit, the storage unit, the calculating unit, and the control unit.

16. The video display system according to claim 15, wherein the image capturing terminal further comprises the display unit, the display posture information acquiring unit, the storage unit, the calculating unit, and the control unit.

17. The video display system according to claim 15, wherein the display terminal further comprises the image capturing unit, the image capturing position information acquiring unit, and the image capturing posture information acquiring unit.

* * * * *